United States Patent
Iihara et al.

(10) Patent No.: US 11,466,165 B2
(45) Date of Patent: Oct. 11, 2022

(54) PRINTING PLATE, METHOD OF MANUFACTURING THE SAME, AND METHOD OF MANUFACTURING PRINTED MATTER USING THE SAME

(71) Applicant: TORAY Industries, Inc., Tokyo (JP)

(72) Inventors: Akihiro Iihara, Otsu (JP); Takejiro Inoue, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 131 days.

(21) Appl. No.: 16/982,249

(22) PCT Filed: Apr. 17, 2019

(86) PCT No.: PCT/JP2019/016448
§ 371 (c)(1),
(2) Date: Sep. 18, 2020

(87) PCT Pub. No.: WO2019/203263
PCT Pub. Date: Oct. 24, 2019

(65) Prior Publication Data
US 2021/0047527 A1    Feb. 18, 2021

(30) Foreign Application Priority Data
Apr. 19, 2018   (JP) .............................. JP2018-080380

(51) Int. Cl.
| | |
|---|---|
| *B41C 1/10* | (2006.01) |
| *B41N 1/14* | (2006.01) |
| *B41N 1/00* | (2006.01) |
| *C09D 11/101* | (2014.01) |
| *C09D 11/037* | (2014.01) |

(Continued)

(52) U.S. Cl.
CPC .......... *C09D 11/101* (2013.01); *B41C 1/1033* (2013.01); *B41N 1/003* (2013.01); *B41N 1/14* (2013.01); *C09D 11/037* (2013.01); *C09D 11/102* (2013.01); *C09D 183/04* (2013.01)

(58) Field of Classification Search
None
See application file for complete search history.

(56) References Cited

U.S. PATENT DOCUMENTS

2015/0321497 A1   11/2015   Linger et al.
2019/0023050 A1   1/2019    Kusaka et al.

FOREIGN PATENT DOCUMENTS

| JP | 55-59467 A | 5/1980 |
|---|---|---|
| JP | 5-246016 A | 9/1993 |
| JP | 2002-363515 A | 12/2002 |

(Continued)

OTHER PUBLICATIONS

International Search Report, issued in PCT/JP2019/016448, PCT/ISA/210, dated Jun. 11, 2019.

(Continued)

*Primary Examiner* — Joshua D Zimmerman
(74) *Attorney, Agent, or Firm* — Birch, Stewart, Kolasch & Birch, LLP

(57) ABSTRACT

The present invention relates to a printing plate including a first silicone layer and a second silicone layer which have different ink acceptabilities on a support. An object of the present invention is to provide a printing plate that dispenses with a development step and that has excellent image reproducibility, ink repellency, ink acceptability, and printing durability.

15 Claims, 1 Drawing Sheet

(51) Int. Cl.
*C09D 11/102* (2014.01)
*C09D 183/04* (2006.01)

(56) References Cited

FOREIGN PATENT DOCUMENTS

| | | |
|---|---|---|
| JP | 2005-93844 A | 4/2005 |
| JP | 2015-114447 A | 6/2015 |
| JP | 2018-34367 A | 3/2018 |
| WO | WO 2017/164032 A1 | 9/2017 |

OTHER PUBLICATIONS

Written Opinion of the International Searching Authority, issued in PCT/JP2019/016448, PCT/ISA/237, dated Jun. 11, 2019.

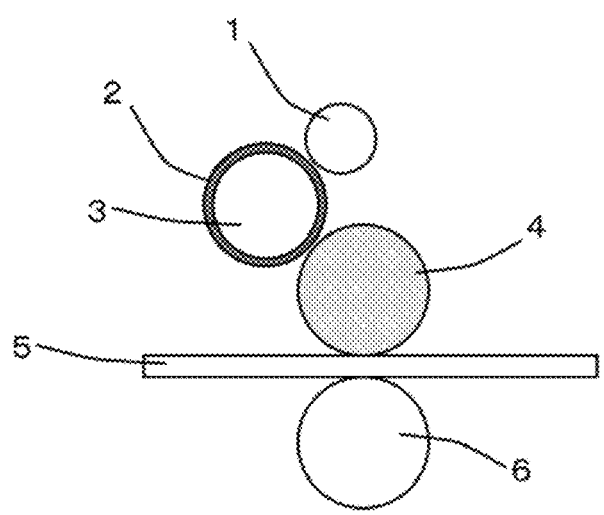

PRINTING PLATE, METHOD OF MANUFACTURING THE SAME, AND METHOD OF MANUFACTURING PRINTED MATTER USING THE SAME

TECHNICAL FIELD

The present invention relates to printing plates, methods of manufacturing the same, and methods of manufacturing printed matter using the same.

BACKGROUND ART

Printing is performed by various methods such as relief printing, intaglio printing, screen printing, and planographic printing, making use of the characteristics of the methods.

In particular, planographic printing is more advantageous than the other printing methods because of, for example, its ability to produce high-definition printed matter and its low total cost, including running cost.

Planographic printing is a printing method comprising providing an ink acceptive image area and an ink repellent non-image area arranged in approximately the same plane of a printing plate, allowing only the image area to receive an ink by making use of the difference in ink adhesion, and transferring the ink to a printing object medium such as paper. Printing plates for planographic printing (hereinafter referred to as "planographic printing plates") are broadly divided into those making the non-image area ink repellent via an effect of dampening water and those using silicone or a fluorine resin in the ink repellent non-image area without using dampening water.

Various proposals have been made for such a planographic printing plate using silicone or a fluorine resin in the ink repellent non-image area.

For example, Patent Literature 1 discloses a waterless planographic printing plate precursor using silicone as an ink repellent layer.

Patent Literature 2 discloses a waterless planographic printing plate, which is obtained by irradiating a waterless planographic printing plate precursor comprising an ink repellent silicone layer on a support having a metal surface with a pulsed laser to change the characteristic of the irradiated site from ink repellent to ink acceptive.

Patent Literature 3 discloses a waterless planographic printing plate, which is obtained by heat transferring a thermosensitive recording layer (ink accepting layer) mainly composed of a silane coupling agent in a pattern on an ink repellent silicone layer.

Patent Literature 4 discloses a waterless planographic printing plate comprising two or more laminated ink repellent silicone layers with different hardness.

CITATION LIST

Patent Literature

Patent Literature 1: WO2016/076286 (Claims)
Patent Literature 2: Japanese Patent Application Laid-Open (JP-A) No. H9-267464 (Claims)
Patent Literature 3: JP-A No. H4-263994 (Claims)
Patent Literature 4: JP-A No. 2015-114447 (Claims)

SUMMARY OF INVENTION

Technical Problem

Patent Literature 1 discloses a waterless planographic printing plate precursor with an ink repellent silicone layer positioned as the top layer. Since a thicker ink repellent silicone layer is effective for improving ink repellency but leads to a significant decrease in image reproducibility, it has been difficult to satisfy both of these characteristics at the same time.

Patent Literature 2 discloses a waterless planographic printing plate, which requires a thinner ink repellent silicone layer for good ink acceptability, and thus it has been difficult to satisfy both ink acceptability and ink repellency at the same time.

Patent Literature 3 discloses a waterless planographic printing plate, which is obtained by heat transferring a thermosensitive recording layer (ink accepting layer) in a pattern on an ink repellent silicone layer. Thus, a thicker ink repellent silicone layer can be provided to satisfy ink repellency and image reproducibility at the same time. However, since a silane coupling agent mainly contained in the thermosensitive recording layer is easily subjected to curing reaction with water in the air, the printing plate precursor has had insufficient storage stability. Furthermore, since the thermosensitive recording layer mainly contains a low molecular weight silane coupling agent, the cured film is very brittle, and it also has been difficult to achieve sufficient printing durability.

Patent Literature 4 discloses a waterless planographic printing plate, which is obtained by laminating two or more silicone layers with different hardness. All the silicone layers are ink repellent, and there is no description that the silicone layer has ink acceptability.

Accordingly, an object of the present invention is to provide a printing plate having excellent image reproducibility, ink repellency, ink acceptability, and printing durability, and a method of manufacturing the printing plate, as well as a method of manufacturing printed matter using the printing plate.

Solution to Problem

In order to achieve the object described above, the printing plate of the present invention has the following structure. The printing plate comprises a first silicone layer and a second silicone layer which have different ink acceptabilities on a support.

Advantageous Effects of Invention

According to the present invention, a printing plate can be obtained having excellent image reproducibility, ink repellency, ink acceptability, and printing durability.

BRIEF DESCRIPTION OF DRAWINGS

FIG. 1 is a cross-sectional view illustrating one embodiment of the method of manufacturing a printed matter according to the present invention.

DESCRIPTION OF EMBODIMENTS

The present invention will be described in detail below.

A printing plate according to the present invention comprises a first silicone layer and a second silicone layer which have different ink acceptabilities on a support.

Supports that can be used in the present invention include dimensionally stable known papers, metals, glasses, and films that have been conventionally used as substrates of planographic printing plates. Specific examples include papers; papers laminated with plastics (such as polyethylene, polypropylene, and polystyrene); metal plates, such as aluminum (including aluminum alloys), zinc, and copper; glass plates, such as soda lime and quartz; silicon wafers; plastic films such as cellulose acetate, polyethylene terephthalate, polyethylene, polyester, polyamide, polyimide, polystyrene, polypropylene, polycarbonate, and polyvinyl acetal; and papers and plastic films on which the above-described metal is laminated or deposited. The plastic films may be transparent or opaque, and preferably are opaque films in view of improving the plate inspectability.

Among these supports, aluminum plates are particularly preferred due to their high dimensional stability and low costs. Polyethylene terephthalate films are particularly preferred as flexible supports for quick printing.

The support may be of any thickness, and a thickness that is compatible with the printing machine used for printing may be selected.

Besides the sheet-like supports described above, a cylindrical or columnar support in which at least the surface of the support is composed of the above-described material (a paper, a metal, a single plastic, or a combination thereof) may be used. Use of such a cylindrical or columnar support allows for seamless printing and endless printing without joints.

In the present invention, a silicone layer provided on a support is defined as a first silicone layer, and a silicone layer provided on the first silicone layer is defined as a second silicone layer.

The first silicone layer and the second silicone layer provided on the support have different ink acceptabilities. As used herein, the term "having different ink acceptabilities" means that when an ink is spread, the ink adheres to one of the silicone layers (having ink acceptability), while the ink does not adhere to another of the silicone layers (having ink repellency). More specifically, a printed matter printed using the printing plate according to the present invention has a white solid portion (a portion printed with the ink repellent silicone layer) without scumming (reflection density: 0), and a solid portion (a portion printed with the ink acceptive silicone layer) having a reflection density of 0.7 or more.

As used herein, the term "silicone layer" refers to a layer comprising 60% by mass or more of a cross-linked siloxane compound. The content of the cross-linked siloxane compound in the layer can be measured by using an FT-IR-ATR analysis and a time-of-flight secondary ion mass spectrometry (TOF-SIMS) analysis in combination.

In the present invention, either of the first silicone layer or the second silicone layer is required to have ink acceptability. Preferably, the first silicone layer has ink repellency, while the second silicone layer has ink acceptability, in view of achieving both image reproducibility and ink repellency.

The ink acceptability and the ink repellency greatly depend on the crosslink density of the silicone layer. A silicone layer with high crosslink density is likely to have ink acceptability, while a silicone layer with low crosslink density is likely to have ink repellency. In addition, a silicone layer with high crosslink density is high modulus, while a silicone layer with low crosslink density is low modulus.

Preferably, the mean modulus of elasticity of the ink repellent first silicone layer is 0.001 to 10 MPa. A mean modulus of elasticity of 0.001 MPa or more results in good printing durability, while a mean modulus of elasticity of 10 MPa or less results in good ink repellency. The mean modulus of elasticity is more preferably 0.01 to 5 MPa, still more preferably 0.1 to 3 MPa.

On the other hand, the mean modulus of elasticity of the ink acceptive second silicone layer is preferably 60 to 2,000 MPa. A mean modulus of elasticity of 60 MPa or more results in exhibition of ink acceptability, while a mean modulus of elasticity of 2,000 MPa or less results in providing a strong film, improving the printing durability. The mean modulus of elasticity is more preferably 100 to 1,500 MPa, still more preferably 150 to 1,000 MPa.

The difference between the mean modulus of elasticity of the first silicone layer and the mean modulus of elasticity of the second silicone layer is preferably 50 to 1,900 MPa, more preferably 100 to 1,400 MPa. When the difference is within the range, a printing plate having both good ink repellency and ink acceptability can be obtained.

A suitable analysis for the modulus of elasticity of the first silicone layer and for the modulus of elasticity of the second silicone layer in the printing plate is performed by a force volume method using an atomic force microscope with a sharp-tip probe and a minimal load. The moduli of elasticity only of the silicone layers excluding the effect of the lower layers and the support can be accurately measured using a silicon or silicon nitride probe having a tip radius of curvature of 5 to 20 nm, and with a load of 1 to 20 nN. In the force volume method, a probe (cantilever) is vertically moved and pressed against the surface of the silicone layer and then released. This series of operation is repeated while two-dimensionally scanning the probe. During this, a force curve is obtained in each cycle, which allows mapping of mechanical properties, such as modulus of elasticity, to be investigated through its analysis. The mean modulus of elasticity can be determined by calculating the arithmetic mean of the moduli of elasticity obtained from 4096 measurement points (length: 64 points×width: 64 points) in the 25 $\mu m^2$ (length: 5 $\mu m$×width: 5 $\mu m$) measurement area.

An analogous analysis of modulus of elasticity is a nanoindentation method using a nanoindenter, which uses an indenter with a large tip radius of curvature and a relatively large load. When such an indenter with a large tip radius of curvature is used, the obtained information on the modulus of elasticity includes effects not only of the silicone layers, but also of the lower layers and even of the support. Thus, the nanoindentation method is not suitable for measurement of the modulus of elasticity of only thin silicone layers like the present invention.

In the present invention, when 12 $\mu l$ of dimethyl silicone oil with a liquid viscosity of 20 cSt is contacted with the surface of the second silicone layer, the spot diameter 10 minutes after the contact is preferably 20 to 37 mm. As used herein, the term "spot diameter 10 minutes after the contact" means the longest diameter of the spot shape of the dimethyl silicone oil 10 minutes after the contact. For example, when the spot shape of the dimethyl silicone oil 10 minutes after the contact is a perfect circle, the diameter of the circle is the spot diameter. When the spot shape is oval, the long axis is the spot diameter. This assessment represents the degree of permeation (swelling) of the dimethyl silicone oil to the contacted silicone layer. When a dimethyl silicone oil comes into contact with an ink repellent silicone layer, the dimethyl silicone oil quickly permeates into the silicone layer and thus is unlikely to spread, resulting in a small spot diameter over time. On the other hand, when a dimethyl silicone oil comes into contact with an ink acceptive silicone layer, permeation of the dimethyl silicone oil into the silicone layer is greatly reduced, and thus the dimethyl silicone oil is likely to spread, resulting in a large spot diameter over time. A spot diameter after 10 minutes of 20 mm or more results in good ink acceptability, and the spot diameter is preferably 22 mm or more, more preferably 24 mm or more. A spot diameter after 10 minutes of 37 mm or less results in good printing durability, and the spot diameter is preferably 35 mm or less, more preferably 33 mm or less.

Examples of commercially available dimethyl silicone oils having a liquid viscosity of 20 cSt include KF-96-20cs (produced by Shin-Etsu Chemical Co., Ltd.), DOWSIL (registered trademark) SH200 Fluid 20CS (produced by Dow Corning Toray Co., Ltd.), WACKER (registered trademark) SILICONE FLUID AK 20 (produced by Wacker Asahikasei Silicone Co., Ltd.), Element 14 (registered trademark) PDMS 20-JC (produced by Momentive Performance Materials Japan LLC.), and DMS-T12 (produced by GELEST Inc.). Assessment with any of these dimethyl silicone oils will give equivalent spot diameters over time.

Preferably, the mean film thickness of the ink repellent first silicone layer is 3 to 30 μm. A mean film thickness of the ink repellent first silicone layer of 3 μm or more allows the printing plate to have sufficient ink repellency, scratch resistance, and printing durability, while a mean film thickness of 30 μm or less is unlikely to be disadvantageous from the viewpoint of economy. The mean film thickness of the ink repellent first silicone layer can be determined by cross-sectional TEM observation. More specifically, a sample is prepared from a printing plate by ultrathin sectioning. TEM observation is performed at an acceleration voltage of 100 kV and a magnification of 2,000. The mean film thickness can be determined by, in a vertical cross-sectional TEM photograph, measuring the film thickness at 10 locations randomly selected from the ink repellent first silicone layer, and calculating the number average value.

In order to increase the adhesive strength with the ink acceptive second silicone layer, the ink repellent first silicone layer preferably contains a compound having a vinyl group. Inclusion of an excess number of vinyl groups over the number of total SiH groups in the total solids contained in the composition for forming the ink repellent first silicone layer described later can result in providing an ink repellent first silicone layer having a vinyl group. The presence of a vinyl group in an ink repellent first silicone layer can be confirmed by analyzing the surface of the ink repellent first silicone layer by a FT-IR-ATR method.

Preferably, the mean film thickness of the ink acceptive second silicone layer is 0.1 to 5 μm. A mean film thickness of the ink acceptive second silicone layer of 0.1 μm or more gives good ink acceptability, while a mean film thickness of 5 μm or less gives good image reproducibility and printing durability. More preferably, the mean film thickness is 0.2 to 1.5 μm. The mean film thickness of the ink acceptive second silicone layer can be determined by cross-sectional TEM observation. More specifically, a sample is prepared from a printing plate by ultrathin sectioning. TEM observation is performed at an acceleration voltage of 100 kV and a magnification of 2,000. The mean total film thickness of the ink repellent first silicone layer and the ink acceptive second silicone layer can be determined by, in a vertical cross-sectional TEM photograph, measuring the film thickness at 10 locations randomly selected from locations where the ink repellent first silicone layer and the ink acceptive second silicone layer are laminated, and calculating the number average value. The mean film thickness of the ink acceptive second silicone layer can be determined by subtracting the mean film thickness of the ink repellent first silicone layer determined by the above-described method from the obtained mean total film thickness of the ink repellent first silicone layer and the ink acceptive second silicone layer.

The silicon concentration in the ink acceptive second silicone layer is preferably 25 to 50% by mass. A silicon concentration in the ink acceptive second silicone layer of 25% by mass or more is preferred in view of increasing the adhesive strength with the ink repellent first silicone layer, and 30% by mass or more is more preferred. A silicon concentration in the ink acceptive second silicone layer of 50% by mass or less is preferred in view of improving the printing durability, and 45% by mass or more is more preferred.

The silicon concentration in the ink acceptive second silicone layer can be determined by an elementary analysis using TOF-SIMS.

Next, the first silicone layer, the second silicone layer, and the primer layer contained in the printing plate according to the present invention will be described below.

As the first silicone layer, a conventionally known ink repellent silicone layer that have been disclosed as an ink repellent layer for a waterless planographic printing plate precursor can be used.

Specific examples of a composition for forming a first silicone layer used in the present invention include, but not limited to, the followings.

Preferably, the composition for forming a first silicone layer used in the present invention contains a siloxane compound having two or more vinyl groups in its molecule, more preferably three or more vinyl groups, still more preferably five or more vinyl groups; a siloxane compound having three or more SiH groups in its molecule; and a reaction catalyst. Further, the composition may contain a reaction inhibitor and a silane coupling agent.

Examples of the siloxane compound having two or more vinyl groups in its molecule include diorganopolysiloxane having vinyl groups at the both ends of the molecule, organovinylpolysiloxane, copolymers of organovinylsiloxane and diorganosiloxane, and compounds having in the molecule two or more diorganovinylsiloxy groups. Among these, preferred are diorganopolysiloxane having vinyl groups at the both ends of the molecule, and copolymers of organovinylsiloxane and diorganosiloxane. Two or more of them may be contained.

Diorganopolysiloxane having vinyl groups at the both ends of the molecule, and copolymers of organovinylsiloxane and diorganosiloxane have a linear, cyclic, branched, or network molecular structure. In addition, the organic groups bound to the silicon atom may be the same or different, and each represent a monovalent organic group without an aliphatic unsaturated bond. Examples of the monovalent organic group without an aliphatic unsaturated bond include alkyl groups such as a methyl group, an ethyl group, a propyl group, a butyl group, a pentyl group, a hexyl group, a heptyl group; aryl groups such as a phenyl group, a tolyl group, a xylyl group, and a naphthyl group; aralkyl groups such as a benzyl group, and a phenethyl group; and alkyl halide groups such as a chloromethyl group, a 3-chloropropyl group, and a 3,3,3-trifluoropropyl group.

Preferably, 50 mol % or more of the total monovalent organic groups without an aliphatic unsaturated bond is a methyl group, from the viewpoint of ink repellency of the printing plate. The weight average molecular weight of the siloxane compound having two or more vinyl groups in its molecule is preferably 30,000 or more from the viewpoint of improving the printing durability and scratch resistance, and is preferably 300,000 or less from the viewpoint of improving the coating properties. The weight average molecular weight, in terms of polystyrene, can be obtained by measurement using GPC.

The content of the siloxane compound having two or more vinyl groups in its molecule in the total solids contained in the composition for forming a first silicone layer is preferably 60% by mass or more, more preferably 70% by mass or more, from the viewpoint of improving the ink repellency of the first silicone layer. The content is also preferably 99% by mass or less from the viewpoint of ensuring the curability of the first silicone layer.

As used herein, the term "total solids contained in the composition for forming a first silicone layer" expresses a component remaining after applying and drying (removing the volatile component) the composition for forming a first silicone layer.

Examples of the siloxane compound having three or more SiH groups in its molecule include organohydropolysiloxane, copolymers of organohydrosiloxane and diorganosiloxane, and compounds having in the molecule three or more diorganohydrosiloxy groups. Among these, preferred are organohydropolysiloxane, and copolymers of organohydrosiloxane and diorganosiloxane. Two or more of them may be contained. The number of SiH groups in the molecule is preferably five or more, more preferably six or more, in terms of improving the curability of the first silicone layer.

Organohydropolysiloxane, and copolymers of organohydrosiloxane and diorganosiloxane have a linear, cyclic, branched, or network molecular structure. In addition, the organic groups bound to the silicon atom may be the same or different, and each represent a monovalent organic group without an aliphatic unsaturated bond. Examples of the monovalent organic group without an aliphatic unsaturated bond include alkyl groups such as a methyl group, an ethyl group, a propyl group, a butyl group, a pentyl group, a hexyl group, a heptyl group; aryl groups such as a phenyl group, a tolyl group, a xylyl group, and a naphthyl group; aralkyl groups such as a benzyl group, and a phenethyl group; and alkyl halide groups such as a chloromethyl group, a 3-chloropropyl group, and a 3,3,3-trifluoropropyl group.

The content of the siloxane compound having three or more SiH groups in its molecule in the total solids contained in the composition for forming a first silicone layer is preferably 0.5% by mass or more, more preferably 1% by mass or more, from the viewpoint of improving the curability of the first silicone layer. The content is also preferably 10% by mass or less, more preferably 5% by mass or less, in terms of improving the ink repellency.

The concentration of H groups derived from SiH groups in the total solids contained in the composition for forming a first silicone layer according to the present invention is preferably 0.001 to 0.04% by mass. The concentration of H groups derived from SiH groups in the total solids contained in the composition for forming a first silicone layer is preferably 0.001% by mass or more, from the viewpoint of improving the curability of the first silicone layer. The concentration of H groups derived from SiH groups in the total solids contained in the composition for forming a first silicone layer is also preferably 0.04% by mass or less, from the viewpoint of improving the ink repellency of the first silicone layer.

As for the relationship between the concentration of H groups derived from SiH groups in the total solids contained in the composition for forming a first silicone layer and the mean modulus of elasticity of the first silicone layer as described above, when the concentration of H groups derived from SiH groups in the total solids contained in the composition for forming a first silicone layer is 0.001% by mass, the mean modulus of elasticity is about 0.001 MPa. When the concentration of H groups derived from SiH groups in the total solids contained in the composition for forming a first silicone layer is 0.04% by mass, the mean modulus of elasticity is about 10 MPa.

The reaction catalyst to be used may be one known as a hydrosilylation reaction catalyst, which preferably contains platinum or rhodium due to high reactivity. Specific examples include platinum alone, solid platinum supported on a carrier (such as alumina, silica, or carbon black), chloroplatinic acid, platinum-olefin complexes, platinum-vinylsilane complexes, platinum-vinylsiloxane complexes, platinum-phosphine complexes, platinum-phosphite complexes, platinum-acetylacetone complexes, platinum-alkyl acetoacetate ester complexes, and platinum-dialkyl malonate ester complexes, as well as platinum-hydrocarbon complexes described in U.S. Pat. Nos. 3,159,601 and 3,159,662 by Ashby et al., and platinum alcoholate catalysts described in U.S. Pat. No. 3,220,972 by Lamoreaux et al. Examples of the catalyst, other than the platinum compounds, include $RhCl(PPh_3)_3$, $RhCl_3$, $RhAl_2O_3$, $RuCl_3$, $IrCl_3$, $FeCl_3$, $AlCl_3$, $PdCl_2.2H_2O$, $NiCl2$, and $TiCl_4$. These reaction catalysts may be used alone, or two or more of these may be used in combination.

The content of the reaction catalyst in the total solids contained in the composition for forming a first silicone layer is preferably 0.0001% by mass or more, more preferably 0.001% by mass or more, from the viewpoint of improving the curability of the first silicone layer. The content of the reaction catalyst in the total solids contained in the composition for forming a first silicone layer is also preferably 1% by mass or less, more preferably 0.1% by mass or less, from the viewpoint of improving the pot life of the composition for forming a first silicone layer.

The reaction inhibitor to be used may be one known as a hydrosilylation reaction inhibitor or a reaction retardant. Preferred examples include amine compounds and acetylene compounds, and more preferred examples include pyridine, picoline, 2,2'-dipyridyl, 2-butanoneoxime, acetylene alcohols, and acetylene silane. Examples of the acetylene alcohols include 2-methyl-3-butyn-2-ol, 2-phenyl-3-butyn-2-ol, 1-ethinyl-1-hexanol, 3,5-dimethyl-1-hexyn-3-ol, and 3-methyl-1-pentyn-3-ol. Two or more of them may be contained. When the composition for forming a first silicone layer contains these reaction inhibitors, it has improved pot life.

The content of the reaction inhibitor based on 100 parts by mass of the total solids contained in the composition for forming a first silicone layer is preferably 0.01 parts by mass or more, more preferably 0.1 parts by mass or more, from the viewpoint of improving the pot life of the composition for forming a first silicone layer. The content of the reaction inhibitor based on 100 parts by mass of the total solids contained in the composition for forming a first silicone layer is also preferably 20 parts by mass or less, more preferably 15 parts by mass or less, from the viewpoint of ensuring the curability of the first silicone layer.

Examples of the silane coupling agent include, but are not limited to, methyltriacetoxysilane, ethyltriacetoxysilane, phenyltriacetoxysilane, toluyltriacetoxysilane, xylyltriacetoxysilane, methyltris(methylethylketoximino)silane, ethyltris(methylethylketoximino)silane, phenyltris(methylethylketoximino)silane, toluyltris(methylethylketoximino)silane, xylyltris(methylethylketoximino)silane, vinyltriacetoxysilane, allyltriacetoxysilane, 3-acryloxypropyltriacetoxysilane, 3-methacryloxypropyltriacetoxysilane, vinyltris(methylethylketoximino)silane, allyltris(methylethylketoximino)silane, 3-acryloxypropyltris(methylethylketoximino)silane, and 3-methacryloxypropyltris(methylethylketoximino)silane. Among these, preferred are vinyltriacetoxysilane and vinyltris(methylethylketoximino) silane, in view of improving the reactivity with the siloxane compound having three or more SiH groups in its molecule and the adhesion to the lower layer, and of reducing the decline in the ink repellency.

The content of the silane coupling agent in the total solids contained in the composition for forming a first silicone layer is preferably 0.5% by mass or more, more preferably 1% by mass or more, from the viewpoint of improving the adhesion to the lower layer. The content is also preferably 10% by mass or less, more preferably 5% by mass or less, from the viewpoint of improving the ink repellency.

In order to further improve the ink repellency, the composition for forming a first silicone layer preferably contains a liquid having a surface tension at 25° C. of 30 mN/m or less. When the surface tension is 30 mN/m or less, the liquid having a surface tension at 25° C. of 30 mN/m or less appears on the surface of the first silicone layer and helps peeling of an ink, allowing for improvement of the ink repellency and increase in the scumming start temperature. The liquid is more preferably having a surface tension at 25° C. of 22 mN/m or less, still more preferably 21 mN/m or less, from the viewpoint of improving the ink repellency. The surface tension can be measured by a known measurement method, a Wilhelmy method using a platinum plate (may also referred to as plate method or vertical plate method).

The liquid having a surface tension at 25° C. of 30 mN/m or less, after being left in a 1-atm environment at 150° C. for 24 hours, preferably reduce its mass by 0 to 0.5% by mass. When the mass reduction after being left in a 1-atm environment at 150° C. for 24 hours is 0 to 0.5% by mass, the liquid is unlikely to volatilize during the manufacturing and storing of the printing plate and to lose its ink repellent effect.

The content of the liquid having a surface tension at 25° C. of 30 mN/m or less in the total solids contained in the composition for forming a first silicone layer is preferably 5 to 40% by mass. When the content is 5% by mass or more, the ink repellency is significantly improved. When the content is 40% by mass or less, a sufficient strength of the first silicone layer can be ensured, so that the printing durability can be maintained.

The liquid having a surface tension at 25° C. of 30 mN/m or less is preferably a silicone compound, more preferably a silicone oil. As used herein, the term "silicone oil" refers to a polysiloxane component that is not involved in crosslinking of the first silicone layer. Specific examples include dimethyl silicone oils such as a trimethylsilyl group-terminated polydimethylsiloxane, a cyclic polydimethylsiloxane, a trimethylsilyl group-terminated dimethylsiloxane-methylphenylsiloxane copolymer, and a trimethylsilyl group-terminated dimethylsiloxane-diphenylsiloxane copolymer, as well as modified silicone oils in which various organic groups are introduced to some intramolecular methyl groups, such as an alkyl-modified silicone oil, a fluorine-modified silicone oil, a polyether-modified silicone oil, an alcohol-modified silicone oil, an amino-modified silicone oil, an epoxy-modified silicone oil, an epoxy polyether-modified silicone oil, a phenol-modified silicone oil, a carboxy-modified silicone oil, a mercapto-modified silicone oil, an amide-modified silicone oil, a caunauba-modified silicone oil, and a higher fatty acid modified silicone oil.

The molecular weight of the liquid having a surface tension at 25° C. of 30 mN/m or less is preferably 200 to 100,000 in weight average molecular weight. When the weight average molecular weight is 200 or more, the liquid having a surface tension at 25° C. of 30 mN/m or less is less likely to volatilize during the manufacturing and storing of the printing plate. When the weight average molecular weight is 100,000 or less, bleed-out from the first silicone layer is reduced. More preferably, the weight average molecular weight is 1,000 to 10,000. The weight average molecular weight, in terms of polystyrene, can be obtained by measurement using GPC.

The composition for forming a first silicone layer may also contain known reinforcing agents such as silica, and a silicone resin having a functional group, e.g., a vinyl group, a SiH group, or a silanol group, in order to increase the rubber strength.

The composition for forming a first silicone layer may also contain a solvent in order to improve the coating properties.

Examples of the solvent include an aliphatic, alicyclic, or aromatic hydrocarbon, a halogenated hydrocarbon, and a chain or cyclic ether compound. Among them, preferred is an aliphatic or alicyclic hydrocarbon from the viewpoint of improving the economy and safety. From the viewpoint of improving the solubility of the solid content contained in the composition for forming a first silicone layer, the solubility parameter of the solvent is preferably 16.4 $(MPa)^{1/2}$ or less, more preferably 15.4 $(MPa)^{1/2}$ or less, still more preferably 14.4 $(MPa)^{1/2}$ or less. The solubility parameter can be calculated using a Fedors' estimation method. From the viewpoint of improving the safety and handleability, the boiling point at 1 atm is preferably 60° C. or higher, more preferably 80° C. or higher. In terms of improving the drying properties of the coating liquid, the boiling point at 1 atm is also preferably 150° C. or lower, more preferably 120° C. or lower. Specific examples of such a solvent include a linear or branched $C_{6-9}$ aliphatic hydrocarbon, and an alicyclic hydrocarbon such as cyclohexane, methylcyclohexane, ethylcyclohexane, dimethylcyclohexane, or trimethylcyclohexane. Two or more of the solvents may be used in combination, or a commercially available solvent may be used, in which the solvents are pre-mixed, including the following:

Mixtures of branched aliphatic hydrocarbons: including MARUKASOL 8 (manufactured by Maruzen Petrochemical Co., Ltd.), "ISOPAR" (registered trademark) C, "ISOPAR" (registered trademark) E (both of which are manufactured by Exxon Mobil Corporation), IP Solvent 1016 (manufactured by Idemitsu Kosan Co., Ltd.), and "ISOSOL" (registered trademark) 200 (manufactured by JX Nippon Oil & Energy Corporation), which are available from the manufacturing companies.

Mixtures of alicyclic hydrocarbons: including EXXSOL DSP80/100, EXXSOL DSP100/140, EXXSOL D30 (all of which are manufactured by Exxon Mobil Corporation), and CS gasoline (manufactured by JX Nippon Oil & Energy Corporation), which are available from the manufacturing companies.

Although solvents other than the above-described solvents can be used in the mixture, the above-described solvents are preferably contained in an amount of 80% by volume or more based on the entire solvent, more preferably 90% by volume or more, from the viewpoint of improving the solubility of the composition for forming a first silicone layer.

Specific but non-limiting methods of preparing the composition for forming a first silicone layer will be described below.

For example, a solvent, a siloxane compound having two or more vinyl groups in its molecule, a siloxane compound having three or more SiH groups in its molecule, a liquid having a surface tension at 25° C. of 30 mN/m or less, a reaction inhibitor, and a silane coupling agent are added to a vessel and stirred until the components are homogeneously mixed. In addition, a reaction catalyst is added, and stirred until the components are homogeneously mixed to obtain a composition for forming a first silicone layer.

From the viewpoint of maintaining the curability, the reaction catalyst is preferably added immediately before application of the composition for forming a first silicone layer.

The first silicone layer can be formed by applying the above-mentioned composition for forming a first silicone layer on a support or another layer provided on a support.

Next, the composition for forming a second silicone layer will be described below.

Preferably, the composition for forming a second silicone layer according to the present invention contains a siloxane compound having three or more SiH groups in its molecule. Here, the number of SiH groups means the average number of SiH groups possessed by a single molecule of a siloxane compound. The number of SiH groups is preferably five or more, more preferably six or more, from the viewpoint of improving the curability of the second silicone layer. The number of intramolecular SiH groups can be determined from the number average molecular weight obtained by gel permeation chromatography (GPC) and the concentration of H groups derived from SiH groups obtained by a proton nuclear magnetic resonance ($^1$H-NMR) method.

Examples of the siloxane compound having three or more SiH groups in its molecule include organohydropolysiloxane, copolymers of organohydrosiloxane and diorganosiloxane, and compounds having in the molecule three or more diorganohydrosiloxy groups. Among these, preferred are organohydropolysiloxane, and copolymers of organohydrosiloxane and diorganosiloxane, and particularly preferred is organohydropolysiloxane. Two or more of them may be contained.

Organohydropolysiloxane, and copolymers of organohydrosiloxane and diorganosiloxane have a linear, cyclic, branched, or network molecular structure. In addition, the organic groups bound to the silicon atom may be the same or different, and each represent a monovalent organic group without an aliphatic unsaturated bond. Examples of the monovalent organic group without an aliphatic unsaturated bond include alkyl groups such as a methyl group, an ethyl group, a propyl group, a butyl group, a pentyl group, a hexyl group, a heptyl group; aryl groups such as a phenyl group, a tolyl group, a xylyl group, and a naphthyl group; aralkyl groups such as a benzyl group, and a phenethyl group; and alkyl halide groups such as a chloromethyl group, a 3-chloropropyl group, and a 3,3,3-trifluoropropyl group.

The concentration of H groups derived from SiH groups in the total solids contained in the composition for forming a second silicone layer according to the present invention is preferably 0.15 to 1.6% by mass.

As used herein, the term "total solids contained in the composition for forming a second silicone layer" expresses a component remaining after applying and drying (removing the volatile component) the composition for forming a second silicone layer.

The concentration of H groups derived from SiH groups in the total solids contained in the composition for forming a second silicone layer is preferably 0.15% by mass or more, from the viewpoint of improving the ink acceptability. From the viewpoint of obtaining sufficient ink acceptability, the concentration is more preferably 0.20% by mass or more, still more preferably 0.30% by mass or more. The concentration of H groups derived from SiH groups in the total solids contained in the composition for forming a second silicone layer is also preferably 1.6% by mass or less, from the viewpoint of improving the printing durability. From the viewpoint of obtaining sufficient printing durability, the concentration is more preferably 1.20% by mass or less, still more preferably 0.80% by mass or less.

As for the relationship between the concentration of H groups derived from SiH groups in the total solids contained in the composition for forming a second silicone layer and the mean modulus of elasticity of the second silicone layer as described above, when the concentration of H groups derived from SiH groups in the total solids contained in the composition for forming a second silicone layer is 0.15% by mass, the mean modulus of elasticity is about 60 MPa; and when the concentration of H groups derived from SiH groups in the total solids contained in the composition for forming a second silicone layer is 1.6% by mass, the mean modulus of elasticity is about 2,200 MPa. For the content to obtain a mean modulus of elasticity of 2,000 MPa, the concentration of H groups derived from SiH groups in the total solids contained in the composition for forming a second silicone layer is about 1.4% by mass.

As for the relationship between the concentration of H groups derived from SiH groups in the total solids contained in the composition for forming a second silicone layer and the spot diameter of 12 μl of a dimethyl silicone oil with a liquid viscosity of 20 cSt 10 minutes after being contacted with the surface of the above-described second silicone layer, when the concentration of H groups derived from SiH groups in the total solids contained in the composition for forming a second silicone layer is 0.15% by mass, the spot diameter of 12 μl of a dimethyl silicone oil with a liquid viscosity of 20 cSt 10 minutes after being contacted with the surface of the second silicone layer is about 20 mm; and when the concentration of H groups derived from SiH groups in the total solids contained in the composition for forming a second silicone layer is 1.6% by mass, the spot diameter of 12 μl of a dimethyl silicone oil with a liquid viscosity of 20 cSt 10 minutes after being contacted with the surface of the second silicone layer is about 37 mm.

The concentration of H groups derived from SiH groups in the composition for forming a second silicone layer can be calculated from the concentration of H groups in the compound having a SiH group and the content of the compound having a SiH group in the composition for forming a second silicone layer.

Next, the method of measuring the concentration of H groups derived from SiH groups in the composition for forming a second silicone layer will be described. When the composition for forming a second silicone layer contains a volatile component (such as a reaction inhibitor, a ligand compound for the reaction catalyst, a solvent as described later), the volatile component is preferably removed before analysis, in order to accurately determine the concentration of H groups derived from SiH groups in the total solids contained in the composition for forming a second silicone layer. The volatile component can be removed through distillation under atmospheric pressure or reduced pressure. Since removal of a reaction inhibitor causes a hydrosilylation reaction between vinyl groups and SiH groups in the composition for forming a second silicone layer, a trace amount of a catalyst inhibitor (catalyst poison) for catalyst inactivation is preferably added prior to removal of the volatile component The catalyst inhibitor to be preferably used is a known catalyst inhibitor with a higher boiling point than the distillation temperature (a compound containing nitrogen, phosphorus, and sulfur in the molecule).

The concentration of H groups derived from SiH groups in the total solids contained in the composition for forming a second silicone layer can be determined by analyzing the total solids contained in the composition for forming a second silicone layer obtained through the operation described above using a $^1$H-NMR method.

Preparative separation of components in the total solids contained in the composition for forming a second silicone layer obtained through the removal of volatile components described above can be made by diluting the composition with a solvent (eluent) and passing it through a column packed with filler particles. Preparative separation of components using a preparative HPLC (high performance liquid chromatography) system is also suitable.

The solvent to be used may be a solvent in which the total solids contained in the composition for forming a second silicone layer can be solved, and a linear, branched, or cyclic saturated hydrocarbon is particularly preferably used in terms of increasing the subsequent analytical accuracy.

The filler particle to be used may be a particle such as activated carbon, silica gel, or alumina.

The components separated in the above-described operation can be analyzed by the above-mentioned and below-mentioned methods to determine the number of intramolecular functional groups, the concentration of functional groups, the weight average molecular weight, and the number average molecular weight.

Preferably, the composition for forming a second silicone layer used in the present invention further contain a siloxane compound having three or more vinyl groups in its molecule. Here, the number of vinyl groups means the average number of vinyl groups possessed by a single molecule of a siloxane compound. The number of vinyl groups is more preferably five or more, still more preferably six or more, from the viewpoint of improving the curability of the second silicone layer. The number of intramolecular vinyl groups can be determined from the number average molecular weight obtained by GPC and the concentration of vinyl groups obtained by a $^1$H-NMR method.

Examples of the siloxane compound having in its molecule three or more vinyl groups include organovinylpolysiloxane, copolymers of organovinylsiloxane and diorganosiloxane, and compounds having in the molecule three or more diorganovinylsiloxy groups. Among them, preferred are organovinylpolysiloxane, and copolymers of organovinylsiloxane and diorganosiloxane, and particularly preferred are copolymers of organovinylsiloxane and diorganosiloxane. Two or more of them may be contained.

Organovinylpolysiloxane, and copolymers of organovinylsiloxane and diorganosiloxane have a linear, cyclic, branched, or network molecular structure. In addition, the organic groups bound to the silicon atom may be the same or different, and each represent a monovalent organic group without an aliphatic unsaturated bond. Examples of the monovalent organic group without an aliphatic unsaturated bond include alkyl groups such as a methyl group, an ethyl group, a propyl group, a butyl group, a pentyl group, a hexyl group, a heptyl group; aryl groups such as a phenyl group, a tolyl group, a xylyl group, and a naphthyl group; aralkyl groups such as a benzyl group, and a phenethyl group; and alkyl halide groups such as a chloromethyl group, a 3-chloropropyl group, and a 3,3,3-trifluoropropyl group.

The concentration of vinyl groups in the total solids contained in the composition for forming a second silicone layer according to the present invention is preferably 0.5 to 15% by mass in the total solids contained in the composition for forming a second silicone layer. The concentration of vinyl groups in the total solids contained in the composition for forming a second silicone layer is preferably 0.5% by mass or more, more preferably 1% by mass or more, from the viewpoint of improving the curability and the ink acceptability. The concentration of vinyl groups in the total solids contained in the composition for forming a second silicone layer is also preferably 15% by mass or less, more preferably 10% by mass or less, from the viewpoint of improving the printing durability.

The concentration of vinyl groups in the total solids contained in the composition for forming a second silicone layer can be determined by analyzing the total solids contained in the composition for forming a second silicone layer obtained through the operation described above using a $^1$H-NMR method.

The weight average molecular weight of the siloxane compound having three or more vinyl groups in its molecule is preferably 25,000 to 250,000. The weight average molecular weight is preferably 25,000 or more from the viewpoint of improving the printing durability, and is preferably 250,000 or less from the viewpoint of improving the coating properties. The weight average molecular weight, in terms of polystyrene, can be obtained by measurement using GPC.

The concentration of silicon in the total solids contained in the composition for forming a second silicone layer is preferably 25 to 50% by mass. The concentration of silicon in the total solids contained in the composition for forming a second silicone layer is preferably 25% by mass or more from the viewpoint of improving the adhesive strength with the lower ink repellent layer. The concentration is more preferably 30% by mass or more, still more preferably 35% by mass or more. The concentration of silicon in the total solids contained in the composition for forming a second silicone layer is also preferably 50% by mass or less, more preferably 45% by mass or less, from the viewpoint of improving the printing durability.

The concentration of silicon in the total solids contained in the composition for forming a second silicone layer can be determined by an elementary analysis of the total solids contained in the composition for forming a second silicone layer obtained through the operation described above using inductively coupled plasma mass spectrometry (ICP-MS).

Preferably, the composition for forming a second silicone layer used in the present invention further contain a reaction catalyst.

Examples of the reaction catalyst include the above-described reaction catalysts illustrated in description of the composition for forming a first silicone layer.

The content of the reaction catalyst in the total solids contained in the composition for forming a second silicone layer is preferably 0.0001% by mass or more, more preferably 0.001% by mass or more, from the viewpoint of improving the curability of the second silicone layer. The content of the reaction catalyst in the total solids contained in the composition for forming a second silicone layer is also preferably 1% by mass or less, more preferably 0.1% by mass or less, from the viewpoint of improving the pot life of the composition for forming a second silicone layer.

Preferably, the composition for forming a second silicone layer used in the present invention further contain a reaction inhibitor.

Examples of the reaction inhibitor include the above-described reaction inhibitors illustrated in description of the composition for forming a first silicone layer.

The content of the reaction inhibitor based on 100 parts by mass of the total solids contained in the composition for forming a second silicone layer is preferably 0.01 parts by mass or more, more preferably 0.1 parts by mass or more, from the viewpoint of improving the pot life of the composition for forming a second silicone layer. The content of the reaction inhibitor based on 100 parts by mass of the total solids contained in the composition for forming a second silicone layer is preferably 20 parts by mass or less, more preferably 15 parts by mass or less, from the viewpoint of ensuring the curability of the second silicone layer.

The total content of the siloxane compounds in the total solids contained in the composition for forming a second silicone layer is preferably 60 to 99.9999% by mass. Here, the siloxane compounds in the total solids contained in the composition for forming a second silicone layer refer to all siloxane compounds contained in the total solids in the composition for forming a second silicone layer, such as the siloxane compound having three or more SiH groups in its molecule and the siloxane compound having three or more vinyl groups in its molecule, as described above, as well as the siloxane compound having a vinyl group in its molecule, which may be contained in a reaction catalyst mixture. The total content of the siloxane compounds in the total solids contained in the composition for forming a second silicone layer refers to total content of the above-described all siloxane compounds contained in the total solids in the composition for forming a second silicone layer. The total content of the siloxane compounds in the total solids contained in the composition for forming a second silicone layer is preferably 60% by mass or more, more preferably 70% by mass or more, still more preferably 80% by mass or more, from the viewpoint of improving the adhesive strength with the lower first silicone layer. The total content of the siloxane compounds in the total solids contained in the composition for forming a second silicone layer is also preferably 99.9999% by mass or less, in terms of improving the curability of the coating film.

The composition for forming a second silicone layer used in the present invention may contain a solvent in order to improve the coating properties.

Examples of the solvent include the above-described solvents illustrated in description of the composition for forming a first silicone layer.

Although solvents other than the above-described solvents can be used in the mixture, the above-described solvents are preferably contained in an amount of 80% by volume or more based on the entire solvent, more preferably 90% by volume or more, from the viewpoint of improving the solubility of the solid content contained in the composition for forming a second silicone layer.

Further, the composition for forming a second silicone layer of the present invention may contain colored dyes and colored pigments as described in JP-A No. 2002-244279 and WO2008/056588, in order to impart plate inspectability to the printing plate.

Specific but non-limiting methods of preparing the composition for forming a second silicone layer will be described below.

For example, a solvent, a siloxane compound having three or more SiH groups in its molecule, and a reaction inhibitor are added to a vessel and stirred until the components are homogeneously mixed. In addition, a reaction catalyst is added, and stirred until the components are homogeneously mixed to obtain a composition for forming a second silicone layer.

When containing a siloxane compound having three or more vinyl groups in its molecule, the composition for forming a second silicone layer can be obtained according to the preparation method as described below.

For example, a solvent, a siloxane compound having three or more SiH groups in its molecule, a siloxane compound having three or more vinyl groups in its molecule, and a reaction inhibitor are added to a vessel and stirred until the components are homogeneously mixed. In addition, a reaction catalyst is added, and stirred until the components are homogeneously mixed to obtain a composition for forming a second silicone layer.

From the viewpoint of maintaining the curability, the reaction catalyst is preferably added immediately before application of the composition for forming a second silicone layer.

In addition, the printing plate of the present invention may have a primer layer between the support and the first silicone layer in order to improve the adhesion, the plate inspectability, the scratch resistance, the printing durability, and the like.

Examples of the primer layer include, but not limited to, those primer layers described in, for example, JP-A No. 2004-199016, JP-A No. 2004-334025, and JP-A No. 2006-276385 as a heat insulating layer.

The mean film thickness of the primer layer is preferably 1 μm or more, from the viewpoint of improving the scratch resistance, the printing durability, the plate inspectability, and the like of the printing plate. The mean film thickness is also preferably 30 μm or less, more preferably 2 to 20 μm, from the viewpoint of ease of volatilization of the diluent solvent and excellent productivity.

Next, a method of manufacturing a printing plate precursor will be described below.

When a primer layer is provided on a support, a composition for forming a primer layer can be applied on a support, and dried and cured with or without heating to form a primer layer on the support.

The composition for forming a primer layer can be applied by using a slit die coater, a gravure coater, a roll coater, a wire bar coater, or the like, and preferred is a slit die coater.

Heating, for which a hot air dryer, an infrared dryer, or the like can be used, is preferably made by drying at 50 to 250° C. for 30 seconds to 5 minutes.

A first silicone layer is formed by applying the composition for forming a first silicone layer on the support or the primer layer provided on the support, and dried and cured with or without heating.

When the composition for forming a first silicone layer is applied, water adhering to the surface of the support and to the surface of the primer layer is preferably removed as much as possible from the viewpoint of improving the adhesion.

The composition for forming a first silicone layer can be applied by using a slit die coater, a gravure coater, a roll coater, a wire bar coater, or the like, and preferred is a slit die coater.

Heating, for which a hot air dryer, an infrared dryer, or the like can be used, is preferably made by drying at 50 to 200° C. for 30 seconds to 5 minutes.

A second silicone layer is formed by applying the composition for forming a second silicone layer on the first silicone layer, and dried and cured with or without heating.

When the composition for forming a second silicone layer is applied, water adhering to the surface of the first silicone layer is preferably removed as much as possible from the viewpoint of improving the adhesion.

The composition for forming a second silicone layer can be applied by using a slit die coater, a gravure coater, a roll coater, a wire bar coater, or the like, and preferred is a slit die coater.

Heating, for which a hot air dryer, an infrared dryer, or the like can be used, is preferably made by drying at 50 to 200° C. for 30 seconds to 1 hour.

The printing plate precursor of the present invention may be provided with a covering film or an interleaving paper, or both of them on the surface of the printing plate in order to protect the surface of the printing plate.

The covering film is preferably a film having a thickness of 100 μm or less. Specific examples include polyethylene, polypropylene, polyvinyl chloride, polyethylene terephthalate, and cellophane.

The interleaving paper preferably has a weight of 30 to 120 g/m$^2$, more preferably 30 to 90 g/m$^2$. When the weight is 30 g/m$^2$ or more, the interleaving paper has sufficient mechanical strength. When the weight is 120 g/m$^2$ or less, the interleaving paper is not only economically advantageous, but also results in thinner thickness of a laminate of the printing plate precursor or the printing plate and the interleaving paper, which is advantageous from the viewpoint of workability. Preferred examples of the interleaving paper include, but not limited to, information recording base paper, 40 g/m$^2$ (manufactured by Nagoya Pulp Co., Ltd.), metal interleaving paper, 30 g/m$^2$ (manufactured by Nagoya Pulp Co., Ltd.), unbleached kraft paper, 50 g/m$^2$ (manufactured by Chuetsu Pulp & Paper Co., Ltd.), NIP paper, 52 g/m$^2$ (manufactured by Chuetsu Pulp & Paper Co., Ltd.), pure white roll paper, 45 g/m$^2$ (manufactured by Oji Paper Co., Ltd.), and Clupak, 73 g/m$^2$ (manufactured by Oji Paper Co., Ltd.), which can be available from the manufacturing companies.

Next, a method of manufacturing a printing plate from the printing plate precursor will be described. When a covering film or an interleaving paper is provided on the second silicone layer of the printing plate precursor, it is removed prior to production of a printing plate. A printing plate can be obtained by irradiating the printing plate precursor from the side of the second silicone layer with a laser beam having an energy of over the ablation threshold, and ablating the second silicone layer, or the second silicone layer and the upper portion of the first silicone layer, in the laser-irradiated area.

Examples of the laser include, but not limited to, solid-state lasers such as a ruby laser (694 nm), a Ti: sapphire laser (fundamental wave: 800 nm, second harmonic wave: 400 nm, third harmonic wave: 266 nm), alexandrite laser (fundamental wave: 755 nm, second harmonic wave: 378 nm, third harmonic wave: 252 nm), a Nd:YAG laser (fundamental wave: 1064 nm, second harmonic wave: 532 nm, third harmonic wave: 355 nm, fourth harmonic wave: 266 nm, fifth harmonic wave: 213 nm), a Nd:YVO$_4$ laser (fundamental wave: 1064 nm, second harmonic wave: 532 nm, third harmonic wave: 355 nm, fourth harmonic wave: 266 nm, fifth harmonic wave: 213 nm), a Nd:YLF laser (fundamental wave: 1053 nm, second harmonic wave: 527 nm, third harmonic wave: 351 nm, fourth harmonic wave: 263 nm, fifth harmonic wave: 211 nm), a Yb: Fiber laser (1090 nm), and a Nd: glass laser (phosphate glass: 1054 nm, silicate glass: 1062 nm); 300 to 1,600-nm semiconductor lasers comprising a combination of two or more of Group III elements (Al, Ga, and In) and Group V elements (N, P, and As) in the periodic table, such as an InGaAsP laser (1,300 to 1,550 nm), an InGaAs laser (900 to 1,500 nm), an InP laser (918 nm), a GaAs laser (870 nm), an AlGaInP laser (635 to 680 nm), a GaAlAs laser (600 to 870 nm), a GaInN laser (400 to 530 nm), and a GaN laser (365 nm); and gas lasers, such as a carbon dioxide gas laser (10600 nm), a nitrogen gas laser (337 nm), a helium-neon laser (630 nm), an argon ion laser (488 to 514 nm), an excimer laser (e.g., a F$_2$ laser: 157 nm, an ArF laser: 193 nm, a KCl laser: 222 nm, a KrF laser: 248 nm, a XeCl laser: 306 nm, and a XeF laser: 351 nm). Among them, preferably used is a carbon dioxide gas laser or a high-power UV laser from the viewpoint of improving the productivity of the printing plate. Examples of the high-power UV laser include, but not limited to, solid-state UV lasers such as the third harmonic wave of a Ti: sapphire laser, the second and third harmonic waves of an alexandrite laser, the third to fifth harmonic waves of a Nd:YAG laser, the third to fifth harmonic waves of a Nd:YVO$_4$ laser, and the third to fifth harmonic waves of a Nd:YLF laser; and gas UV laser such as a nitrogen gas laser and excimer lasers (a F$_2$ laser, an ArF laser, a KCl laser, a KrF laser, a XeCl laser, and a XeF laser).

A short-wavelength laser with a wavelength of 150 to 400 nm is preferably used from the viewpoint of obtaining higher definition images.

From the viewpoint of reducing the decline in the ink repellency, a pulsed laser that allows for obtaining a higher-power laser than continuous wave operation is preferably used, and an ultra-short pulsed laser with a pulse width of nanoseconds, picoseconds, or femtoseconds is particularly preferred.

From the viewpoint of obtaining higher definition images and reducing the decline in the ink repellency at the same time, an ultra-short pulsed laser with a wavelength of 150 to 400 nm is particularly preferably used.

Laser irradiation may be performed in the atmosphere. When laser irradiation is performed in an inert gas such as nitrogen, helium, neon, argon, krypton, or xenon, oxidation near the surface of the first silicone layer exposed by laser ablation is prevented, so that ink repellence reduction is less likely to occur.

When the resulting printing plates are stacked and stored, an interleaving paper is preferably placed between the plates in order to protect the surface of the plates.

Next, a method of manufacturing a printed matter using a printing plate, an ink, and a printing object medium. The printing plate of the present invention can be suitably used in waterless printing.

The method of manufacturing a printed matter comprises the step of applying an ink on the surface of a printing plate, and transferring the ink to a printing object medium directly or via a blanket.

One embodiment of the method of manufacturing a printed matter of the present invention will be described using FIG. 1. It should be noted that the following description of an embodiment using a blanket cylinder 4 does not limit the present invention. Without using the blanket cylinder 4, an ink may be applied, from an ink roller 1, to a printing plate 2 mounted on a plate cylinder 3, and then directly transferred to a printing object medium. It also should be noted that although the following description illustrates an embodiment in which an ink is supplied from above a printing object medium 5, the ink may be supplied from below the printing object medium 5.

First, an ink is supplied to an ink roller 1. The ink supplied to the ink roller 1 adheres to a printing plate 2 mounted on a plate cylinder 3 at the point of contact between the ink roller 1 and the plate cylinder 3. The ink adhering to the printing plate 2 is transferred to the surface of a blanket cylinder 4 at the point of contact between the printing plate 2 and the blanket cylinder 4. The ink adhering to the blanket cylinder 4 is transferred to a printing object medium 5 at the point of contact between the blanket cylinder 4 and the printing object medium 5 positioned on an impression cylinder 6. The printing object medium 5 is dried, as necessary, to obtain a printed matter. The rotation speeds of the ink roller and the cylinders are not particularly limited, and may be set, as appropriate, according to required quality of the printed matter, ink properties, and the like.

The printing machine used in production of printed matters may be, for example, a known sheet-fed or rotary, direct-printing or offset printing machine. An offset printing machine is preferred because it allows prevention of damage to the printing plate during printing and provision of a larger amount of printed matter. An offset printing machine is composed of a feeding unit, a printing unit, and a delivery unit. The printing unit comprises at least an ink supplier, a plate cylinder, a blanket cylinder, and an impression cylinder.

A preferred offset printing machine comprises a cooling system in the vibrating roller and/or plate cylinder, from the viewpoint of improving the scumming resistance.

In the case of printing using an oil-soluble or water-soluble oxidative polymerization ink, an ink transferred to a printing object medium is dried and/or cured by air drying or heat treatment to obtain a printed matter.

Printing using an active energy ray curing ink is also preferred, in that an ink transferred to a printing object medium is cured immediately after irradiation of an active energy ray from an active energy ray irradiator, giving a printed matter. In this printing, either an oil-soluble or water-soluble active energy ray curing ink can be used.

Examples of the active energy ray include visible light, ultraviolet ray (UV), electron beam (EB), X-ray, and particle ray. Among them, ultraviolet ray and electron beam are preferred from the viewpoint of, for example, ease of handling of the radiation source.

When the curing is conducted by using an ultraviolet ray, use of a UV irradiation apparatus such as high pressure mercury lamp, xenon lamp, metal halide lamp, or LED is preferable. When a metal halide lamp is used, the preferred is curing by using a lamp having an illuminance of 80 to 150 W/cm at a conveyer speed of 50 to 150 m/min in view of the productivity. Particularly when using a substrate comprising a plastic film or a metal, since the substrate tends to expand and contract due to heat generated by the active energy ray, an ultraviolet ray irradiator using an electron beam with low heat generation, or LED (LED-UV) can be preferably used.

When the curing is conducted by using an electron beam, use of an electron beam apparatus capable of emitting an energy beam of 100 to 500 eV is preferable.

Preferred examples of the ink used in the present invention include, but not limited to, inks as described below.

<Ink-1> Oil-Soluble Oxidative Polymerization Ink

Examples of the oil-soluble oxidative polymerization ink include known oil-soluble oxidative polymerization inks that can be washed with an oil-based washing solution disclosed in, for example, JP-A Nos. S48-004107 and H01-306482. Examples of the oil-soluble oxidative polymerization ink also include low environmental impact inks, such as soybean oil inks and vegetable oil inks, as well as so-called Non-VOC inks, in which the solvent component is changed from a conventional mineral oil (petroleum) component to a vegetable oil component, as disclosed in, for example, JP-A Nos. 2005-336301, 2005-126579, 2011-144295, and 2012-224823.

<Ink-2> Water-Soluble Oxidative Polymerization Ink

Examples of the water-soluble oxidative polymerization ink include known water-soluble oxidative polymerization inks that can be washed with water or an aqueous washing solution disclosed in, for example, JP-A No. 2009-57461 and JP 4522094.

<Ink-3> Oil-Soluble Active Energy Ray Curing Ink

Examples of the oil-soluble active energy ray curing ink include known active energy ray curing inks that can be washed with an oil-based washing solution disclosed in, for example, JP 5158274 and JP-A No. 2012-211230. Examples of the active energy ray curing ink also include highly sensitive UV inks used in energy saving (fewer lamps) UV printing and LED-UV printing.

<Ink-4> Water-Soluble Active Energy Ray Curing Ink

Examples of the water-soluble active energy ray curing ink include known active energy ray curing inks that can be washed with water or an aqueous washing solution disclosed in, for example, JP-A No. 2017-52817, WO2017/047817, and WO2017/090663.

Among the inks described above, oil-soluble or water-soluble active energy ray curing inks can be instantly cured by irradiation of an active energy ray after being transferred to a printing object medium, enabling back side printing and post-processing immediately after the curing, which is a benefit not found in conventional oxidative polymerization inks. However, active energy ray curing inks contains no or few scumming preventing component therein unlike conventional oxidative polymerization inks, and thus have a disadvantage that scumming is likely to occur during printing. Since the printing plate of the present invention has high ink repellency, oil-soluble active energy ray curing inks and water-soluble active energy ray curing inks can be suitably used, and water-soluble active energy ray curing inks can be particularly suitably used.

Examples of the printing object medium include, but not limited to, papers such as woodfree paper, art paper, coated paper, cast coated paper, synthetic paper, and newsprint paper; metals such as aluminum, aluminum alloys, iron, steel, zinc, and copper; plastic films such as polyethylene terephthalate, polyethylene, polyester, polyamide, polyimide, polystyrene, polypropylene, polycarbonate, and polyvinyl acetal; and composites of the papers, metals, and plastic films (metal-deposited or -laminated papers and plastic films, plastic film-laminated papers and metals, paper-laminated metals and plastic films).

In the method of manufacturing a printed matter according to the present invention, printing is suitably made on a printing object medium that is non-absorptive for ink component, such as synthetic paper, metal, plastic film, metal-deposited or -laminated paper or plastic film, plastic film-laminated paper or metal, with the side to be printed composed of a metal or a plastic film.

Among them, the side to be printed of the printing object medium with the side to be printed composed of plastic film, such as synthetic paper, plastic film, plastic film-laminated paper or metal, may be surface-treated with, for example, primer resin coating, corona discharge treatment, and plasma treatment, from the viewpoint of improving the adhesion.

Either sheet or rolled printing object medium can be used. When printing is made on a thin film for flexible packaging, roll-to-roll printing using a rolled film is preferably performed.

The thickness of the ink coating film (ink cured film) on the printing object medium is preferably 0.1 to 50 µm. When the thickness of the ink coating film is within the range described above, the ink cost can be reduced while maintaining the good printing quality.

The printing plate of the present invention does not require a development process and does not require the use of pre-treatment chemicals or post-treatment chemicals or the like used in conventional development processes. This leads to no adhesion or permeation of pre-treatment chemicals or post-treatment chemicals to a printing plate and thus no transfer of these chemicals from a printing plate to a printed matter during printing process, so that the printing plate can be particularly suitably used in printing for food packaging applications that are strict in terms of chemical content.

EXAMPLES

The present invention will be described in more detail below with reference to Examples. Evaluation in Examples and Comparative Examples were carried out according to the following method.

Evaluation Method in Examples and Comparative Examples (1) Preparation of Printing Plate Printing plate precursors prepared using the compositions and conditions described in Examples and Comparative Examples were irradiated with an ArF excimer pulsed laser (wavelength: 193 nm) under the conditions of a laser irradiation energy density of 150 mJ/cm$^2$, a pulse repetition frequency of 10 Hz, and an atmosphere of the laser irradiation zone of nitrogen atmosphere for test pattern laser irradiation, and ablating the second silicone layer and the upper portion of the first silicone layer in the laser-irradiated area, to obtain printing plates. The test pattern included a plurality of solid portions, white solid portions, narrowest ink repellent independent lines (length: 1 cm) that can be processed by a laser, and 20-µm-wide ink acceptive independent lines (length: 1 cm), and in which about 70% of 100% of the printed area is a laser irradiated area (non-image area).

(2) Mean Modulus of Elasticity of First Silicone Layer and Second Silicone Layer The mean modulus of elasticity of the first silicone layer (laser irradiated portion) and the second silicone layer (non-laser irradiated portion) of the printing plate obtained by the method (1) described above were assessed and calculated by the following analytical method.

Observer: scanning probe microscopy (SPM): NanoScopeV dimension Icon (manufactured by Bruker)

Probe: silicon cantilever (spring constant=6 N/m)

Tip radius of curvature: 8 nm

Load: 5-20 nN

Scan mode: force volume (contact mode)

Scanning field: 25 µm$^2$ (length: 5 µm×width: 5 µm)

Points of Measurement in Scanning Field: 4096 points (length: 64 points×width: 64 points)

Measurement environment: under the atmosphere at room temperature.

The arithmetic mean of the obtained moduli of elasticity in all points of measurement (4096 points) was considered as the mean modulus of elasticity.

(3) Evaluation of Image Reproducibility

An oil-soluble UV ink, UV 171 CT black M-TW (manufactured by T&K TOKA Corporation) was spread over the printing plate obtained by the method (1) described above using a hand roller made of urethane resin rubber (an ink roller, Trust Zeta (manufactured by Techno Roll Co., Ltd.), processed into a hand roller). The narrowest ink repellent independent line (length: 1 cm) portions that can be processed by a laser, on the ink-spread printing plate were observed under a light microscope, "ECLIPSE" L200 (manufactured by Nikon Corporation, objective lens: "CFI LU Plan Apo EPI" 150× (manufactured by Nikon Corporation)). The line widths at randomly selected 10 locations were measured and used to calculate the mean value, which was considered as the mean line width. Smaller mean line width represents better image reproducibility.

(4) Evaluation of Ink Acceptability

The printing plate obtained by the method (1) described above was mounted on a printing machine, OLIVER466SD (manufactured by Sakurai Graphic Systems Corporation) and used in printing under the conditions shown below.

Printing Conditions

Ink roller: Trust Zeta

Blanket: MC1300 (manufactured by Kinyosha Co., Ltd.)

Plate surface temperature: 20° C.

Printing speed: 8,000 sheets/hour

Printing object medium: OK "TopKote" (registered trademark) plus (manufactured by Oji Paper Co., Ltd.).

Ink

Oil-soluble UV ink: UVI71CT black M-TW.

The ink reflection density of the solid portion of the obtained printed matter was measured using a spectrophotometer, "SpectroEye" (manufactured by X-Rite Inc.). Scores for ink acceptability were as described below.

A: a reflection density of 1.4 or more with an ink supply used in a conventional waterless printing B: a reflection density of 1.4 or more with 1.2 times the ink supply used in a conventional waterless printing C: a reflection density of 0.7-1.3 even with 1.2 times the ink supply used in a conventional waterless printing D: a reflection density of less than 0.7 even with 1.2 times the ink supply used in a conventional waterless printing.

(5) Evaluation of Ink Repellency

The printing plate obtained by the method (1) described above was mounted on OLIVER466SD and used in printing under the conditions shown below.

Printing Conditions

Ink roller: Trust Zeta
Blanket: MC1300
Plate surface temperature: 30° C.
Printing speed: 8,000 sheets/hour
Printing object medium: OK "TopKote" (registered trademark) plus (manufactured by Oji Paper Co., Ltd.).

Ink

Oil-soluble UV ink: UV171CT black M-TW.
The extent of scumming in the non-image areas of the 1,000th printed matter from the start of printing was visually evaluated. Scores for ink repellency were as described below.
A: no scumming
B: Slight scumming only in a portion (gripped portion)
C: Slight scumming over the entire surface
D: Severe scumming over the entire surface.

(6) Evaluation of Printing Durability

The printing plate obtained by the method (1) described above was mounted on OLIVER466SD and used in printing under the conditions shown below.

Printing Conditions

Ink roller: Trust Zeta
Blanket: MC1300
Plate surface temperature: 25° C.-28° C.
Printing speed: 8,000 sheets/hour
Printing object medium: OK "TopKote" (registered trademark) plus (manufactured by Oji Paper Co., Ltd.).

Ink

Oil-soluble UV ink: UV171CT black M-TW.
Printed matters were sampled every 10,000 sheets and observed with a loupe with a magnification of 50× to check the presence of dropout of the 20 μm wide ink acceptive independent lines (length: 1 cm). Scores for printing durability were as described below.
A: fine lines were not dropped out even after printing over 50,000 sheets
B: fine lines were dropped out after printing 30,000 or more to less than 50,000 sheets
C: fine lines were dropped out after printing 10,000 or more to less than 30,000 sheets
D: fine lines were dropped out after printing less than 10,000 sheets.

(7) Measurement of Spot Diameter

The printing plate was placed on a hot plate (plate temperature: 30° C.) leveled using a level. After confirming that the surface temperature of the printing plate was 30° C., 12 μl of a dimethyl silicone oil, KF-96-20cs (manufactured by Shin-Etsu Chemical Co., Ltd., liquid viscosity: 20 cSt) was contacted with the surface of the second silicone layer of the printing plate, and the spot diameter was measured 10 minutes after the contact. The spot diameter was determined by measuring the longest diameter of the spot shape of the dimethyl silicone oil 10 minutes after the contact.

Example 1

A degreased aluminum substrate having a thickness of 0.24 mm (manufactured by Mitsubishi Aluminum Co., Ltd.) was coated with a composition for forming a primer layer described below, and dried at 200° C. for 90 seconds, to provide a primer layer having a mean film thickness of 10 μm.

Composition for Forming Primer Layer

The following (a-1) component, then (b-1), (c-1), (d-1), and (e-1) components were slowly and sequentially put into a vessel while stirring with a three-one motor, and mixed by stirring until the components became homogeneous. To the obtained mixed solution were added (f-1) and (g-1) components, and mixed by stirring for 10 minutes to obtain a composition for forming a primer layer.

(a-1) titanium oxide dispersion: a dispersion of "Tipaque" (registered trademark) CR-50 (manufactured by Ishihara Sangyo Co., Ltd.) in N,N-dimethyl formamide (titanium oxide 50% by mass): 60.0 parts by mass;
(b-1) epoxy resin: "jER" (registered trademark) 1010 (manufactured by Mitsubishi Chemical Corporation): 35.0 parts by mass;
(c-1) polyurethane: "Sanprene" (registered trademark) LQ-T1331D (manufactured by Sanyo Chemical Industries Ltd., solid content concentration: 20% by mass): 375.0 parts by mass;
(d-1) N,N-dimethyl formamide: 730.0 parts by mass;
(e-1) methyl ethyl ketone: 250.0 parts by mass;
(f-1) Alumichelate: "Alumichelate" ALCH-TR (manufactured by Kawaken Fine Chemicals Co., Ltd.): 10.0 parts by mass;
(g-1) leveling agent: "Disparlon" (registered trademark) LC951 (manufactured by Kusumoto Chemical Co., Ltd., solid content: 10% by mass): 1.0 part by mass.

Preparation of (a-1) Titanium Oxide Dispersion

To a sealable standardized glass bottle filled with 1,600.0 g of zirconia beads, "YTZ" (registered trademark) balls (φ: 1 mm, manufactured by Nikkato Corporation), 700.0 g of N,N-dimethyl formamide and 700.0 g of "Tipaque" (registered trademark) CR-50 (manufactured by Ishihara Sangyo Co., Ltd.) were added. After the bottle was sealed and set to a small ball mill rotating stand (manufactured by AS ONE Corporation), the mixture was dispersed for 7 days at a rotation rate of 0.4 msec to obtain a (a-1) titanium oxide dispersion.

Next, a composition-1 for forming a first silicone layer described below was applied on the primer layer and dried at 140° C. for 80 seconds to provide a first silicone layer having a mean film thickness of 8.0 μm.

Composition-1 for Forming First Silicone Layer

The following (a-2), (b-2), and (c-2) components were put into a vessel and mixed by stirring until the components became homogeneous. Dry nitrogen was bubbled through the obtained solution for 20 minutes to remove water in the solution. A (d-2) component was added to the obtained solution, and mixed by stirring for 10 minutes. Immediately before application, a (e-2) component was added and mixed by stirring to obtain a composition-1 for forming a first silicone layer.

(a-2) isoparaffin solvent: "ISOPAR" (registered trademark) E (manufactured by Exxon Mobil Corporation): 895.0 parts by mass;

(b-2) siloxane compound having two or more vinyl groups in its molecule (dimethylvinylsiloxy-terminated-polydimethylsiloxane): DMS-V52 (manufactured by GELEST Inc., weight average molecular weight: 155,000, number of intramolecular vinyl groups: 2.0): 91.0 parts by mass;

(c-2) siloxane compound having three or more SiH groups in its molecule (trimethylsiloxy terminated methylhydrosiloxane-dimethylsiloxane copolymer) HMS-301 (manufactured by GELEST Inc., weight average molecular weight: 1,950, concentration of H groups derived from SiH groups: 0.41% by mass, number of intramolecular SiH groups: 8.0): 6.0 parts by mass;

(d-2) silane coupling agent: vinyltris(methylethylketoximino)silane: 3.0 parts by mass;

(e-2) reaction catalyst (platinum mixture): XC94-C4326 (manufactured by Momentive Performance Materials Japan Inc., solid content concentration: 1% by mass): 5.0 parts by mass.

Next, a composition-1 for forming a second silicone layer described below was applied on the first silicone layer and heated at 140° C. for 80 seconds to provide a second silicone layer having a mean film thickness of 0.4 thereby obtaining a printing plate precursor.

Composition-1 for Forming Second Silicone Layer

The following (a-3), (b-3), (c-3), and (d-3) components were put into a vessel and mixed by stirring until the components became homogeneous. Dry nitrogen was bubbled through the obtained solution for 20 minutes to remove water in the solution. Immediately before application, a (e-3) component was added and mixed by stirring to obtain a composition-1 for forming a second silicone layer.

(a-3) isoparaffin solvent: "ISOPAR" (registered trademark) C (manufactured by Exxon Mobil Corporation): 895.0 parts by mass;

(b-3) siloxane compound having three or more vinyl groups in its molecule (trimethylsiloxy-terminated-vinylmethylsiloxane-dimethylsiloxane copolymer): VDT-954 (manufactured by GELEST Inc., weight average molecular weight: 225,000, concentration of vinyl groups: 4.29% by mass, number of intramolecular vinyl groups: 357.2): 70.0 parts by mass;

(c-3) siloxane compound having three or more SiH groups in its molecule (trimethylsiloxy-terminated-polymethylhydrosiloxane): HMS-993 (manufactured by GELEST Inc., weight average molecular weight: 2,250, concentration of H groups derived from Sill groups: 1.56% by mass, number of intramolecular Sill groups: 35.2): 30.0 parts by mass;

(d-3) reaction inhibitor: 2-methyl-3-butyn-2-ol: 1.5 parts by mass;

(e-3) XC94-C4326: 3.5 parts by mass.

After the obtained printing plate precursor was irradiated in a pattern with a laser from the side of the second silicone layer, the second silicone layer and the upper portion of the first silicone layer in the laser-irradiated area was ablated to obtain a printing plate.

Measurement on the surface of the first silicone layer by an FT-IR-ATR method (IRE:Ge, incidence angle: 60°) resulted in no detection of the absorption bands derived from vinyl groups (3055, 1599, 1408, 960 cm$^{-1}$), demonstrating the absence of vinyl groups in the first silicone layer. The mean modulus of elasticity of the first silicone layer was 1.3 MPa and mean modulus of elasticity of the second silicone layer was 720 MPa, and thus the difference was 718.7 MPa. The silicon concentration in the second silicone layer was 40.0% by mass. The spot diameter was 28 mm.

Example 2

A printing plate was prepared and evaluated in the same manner as in Example 1 except that the composition-1 for forming a first silicone layer was changed to a composition-2 for forming a first silicone layer.

Composition-2 for Forming First Silicone Layer

The following (a-4), (b-4), and (c-4) components were put into a vessel and mixed by stirring until the components became homogeneous. Dry nitrogen was bubbled through the obtained solution for 20 minutes to remove water in the solution. A (d-4) component was added to the obtained solution, and mixed by stirring for 10 minutes. Immediately before application, a (e-4) component was added and mixed by stirring to obtain a composition-2 for forming a first silicone layer.

(a-4) "ISOPAR" (registered trademark) E: 895.0 parts by mass;

(b-4) VDT-954: 82.0 parts by mass;

(c-4) siloxane compound having three or more SiH groups in its molecule (trimethylsiloxy-terminated-methylhydrosiloxane-dimethylsiloxane copolymer): HMS-064 (manufactured by GELEST Inc., weight average molecular weight: 55,000, concentration of H groups derived from SiH groups: 0.08% by mass, number of intramolecular SiH groups: 44.4): 15.0 parts by mass;

(d-4) vinyltris(methylethylketoximino)silane: 3.0 parts by mass;

(e-4) XC94-C4326: 5.0 parts by mass.

Measurement on the surface of the first silicone layer by an FT-IR-ATR method (IRE:Ge, incidence angle: 60°) resulted in detection of the absorption bands derived from vinyl groups (3055, 1599, 1408, 960 cm$^{-1}$), demonstrating the presence of vinyl groups in the first silicone layer. The mean modulus of elasticity of the first silicone layer was 1.8 MPa and the mean modulus of elasticity of the second silicone layer was and 720 MPa, so that the difference was 718.2 MPa. The silicon concentration in the second silicone layer was 40.0% by mass. The spot diameter was 28 mm.

Example 3

A printing plate was prepared and evaluated in the same manner as in Example 2 except that the mean film thickness of the first silicone layer was changed from 8.0 μm to 4.0 μm.

The presence of vinyl groups in the first silicone layer was detected. The mean modulus of elasticity of the first silicone layer was 1.8 MPa and the mean modulus of elasticity of the second silicone layer was and 720 MPa, so that the difference was 718.2 MPa. The silicon concentration in the second silicone layer was 40.0% by mass. The spot diameter was 28 mm.

Example 4

A printing plate was prepared and evaluated in the same manner as in Example 2 except that the mean film thickness of the first silicone layer was changed from 8.0 μm to 16.0 μm.

The presence of vinyl groups in the first silicone layer was detected. The mean modulus of elasticity of the first silicone layer was 1.8 MPa and the mean modulus of elasticity of the second silicone layer was and 720 MPa, so that the difference was 718.2 MPa. The silicon concentration in the second silicone layer was 40.0% by mass. The spot diameter was 28 mm.

Example 5

A printing plate was prepared and evaluated in the same manner as in Example 2 except that the mean film thickness of the first silicone layer was changed from 8.0 μm to 30.0 μm.

The presence of vinyl groups in the first silicone layer was detected. The mean modulus of elasticity of the first silicone layer was 1.8 MPa and the mean modulus of elasticity of the second silicone layers was 720 MPa, so that the difference was 718.2 MPa. The silicon concentration in the second silicone layer was 40.0% by mass. The spot diameter was 28 mm.

Example 6

A printing plate was prepared and evaluated in the same manner as in Example 2 except that the mean film thickness of the second silicone layer was changed from 0.4 μm to 0.15 μm.

The presence of vinyl groups in the first silicone layer was detected. The mean modulus of elasticity of the first silicone layer was 1.8 MPa and the mean modulus of elasticity of the second silicone layer was 700 MPa, so that the difference was 698.2 MPa. The silicon concentration in the second silicone layer was 40.0% by mass. The spot diameter was 28 mm.

Example 7

A printing plate was prepared and evaluated in the same manner as in Example 2 except that the mean film thickness of the second silicone layer was changed from 0.4 μm to 3 μm.

The presence of vinyl groups in the first silicone layer was detected. The mean modulus of elasticity of the first silicone layer was 1.8 MPa and the mean modulus of elasticity of the second silicone layer was 720 MPa, so that the difference was 718.2 MPa. The silicon concentration in the second silicone layer was 40.0% by mass. The spot diameter was 28 mm.

Example 8

A printing plate was prepared and evaluated in the same manner as in Example 2 except that the mean film thickness of the second silicone layer was changed from 0.4 μm to 5 μm.

The presence of vinyl groups in the first silicone layer was detected. The mean modulus of elasticity of the first silicone layer was 1.8 MPa and the mean modulus of elasticity of the second silicone layer was and 720 MPa, so that the difference was 718.2 MPa. The silicon concentration in the second silicone layer was 40.0% by mass. The spot diameter was 28 mm.

Example 9

A printing plate was prepared and evaluated in the same manner as in Example 2 except that the composition-2 for forming a first silicone layer was changed to a composition-3 for forming a first silicone layer.

Composition-3 for Forming First Silicone Layer

The following (a-5), (b-5), and (c-5) components were put into a vessel and mixed by stirring until the components became homogeneous. Dry nitrogen was bubbled through the obtained solution for 20 minutes to remove water in the solution. A (d-5) component was added to the obtained solution, and mixed by stirring for 10 minutes. Immediately before application, a (e-5) component was added and mixed by stirring to obtain a composition-3 for forming a first silicone layer.

(a-5) "1SOPAR" (registered trademark) E: 895.0 parts by mass;
(b-5) VDT-954: 92.0 parts by mass;
(c-5) HMS-993: 5.0 parts by mass;
(d-5) vinyltris(methylethylketoximino)silane: 3.0 parts by mass;
(e-5) XC94-C4326: 5.0 parts by mass.

Measurement on the surface of the first silicone layer by an FT-IR-ATR method (IRE:Ge, incidence angle: 60°) resulted in detection of the absorption bands derived from vinyl groups (3055, 1599, 1408, 960 cm$^{-1}$), demonstrating the presence of vinyl groups in the first silicone layer. The mean modulus of elasticity of the first silicone layer was 23.9 MPa and the mean modulus of elasticity of the second silicone layer was and 720 MPa, so that the difference was 696.1 MPa. The silicon concentration in the second silicone layer was 40.0% by mass. The spot diameter was 28 mm.

Example 10

A printing plate was prepared and evaluated in the same manner as in Example 2 except that the composition-2 for forming a first silicone layer was changed to a composition-4 for forming a first silicone layer.

Composition-4 for Forming First Silicone Layer

The following (a-6), (b-6), and (c-6) components were put into a vessel and mixed by stirring until the components became homogeneous. Dry nitrogen was bubbled through the obtained solution for 20 minutes to remove water in the solution. A (d-6) component was added to the obtained solution, and mixed by stirring for 10 minutes. Immediately before application, a (e-6) component was added and mixed by stirring to obtain a composition-4 for forming a first silicone layer.

(a-6) "ISOPAR" (registered trademark) E: 895.0 parts by mass;
(b-6) VDT-954: 52.0 parts by mass;
(c-6) HMS-064: 45.0 parts by mass;

(d-6) vinyltris(methylethylketoximino)silane: 3.0 parts by mass;

(e-6) XC94-C4326: 5.0 parts by mass.

Measurement on the surface of the first silicone layer by an FT-IR-ATR method (IRE:Ge, incidence angle: 60°) resulted in detection of the absorption bands derived from vinyl groups (3055, 1599, 1408, 960 cm$^{-1}$), demonstrating the presence of vinyl groups in the first silicone layer. The mean modulus of elasticity of the first and silicone layer was 9.8 MPa and the mean modulus of elasticity of the second silicone layer was 720 MPa, so that the difference was 710.2 MPa. The silicon concentration in the second silicone layer was 40.0% by mass. The spot diameter was 28 mm.

Example 11

A printing plate was prepared and evaluated in the same manner as in Example 2 except that the composition-1 for forming a second silicone layer was changed to a composition-2 for forming a second silicone layer described below.

Composition-2 for Forming Second Silicone Layer

The following (a-7), (b-7), (c-7), and (d-7) components were put into a vessel and mixed by stirring until the components became homogeneous. Dry nitrogen was bubbled through the obtained solution for 20 minutes to remove water in the solution. Immediately before application, a (e-7) component was added and mixed by stirring to obtain a composition-2 for forming a second silicone layer.

(a-7) "ISOPAR" (registered trademark) C: 895.0 parts by mass;

(b-7) siloxane compound having three or more vinyl groups in its molecule (trimethylsiloxy-terminated-vinylmethylsiloxane-dimethylsiloxane copolymer): VDT-431 (manufactured by GELEST Inc., weight average molecular weight: 28,000, concentration of vinyl groups: 1.63% by mass, number of intramolecular vinyl groups: 16.9): 90.0 parts by mass;

(c-7) HMS-993: 10.0 parts by mass;

(d-7) 2-methyl-3-butyn-2-ol: 1.5 parts by mass;

(e-7) XC94-C4326: 3.5 parts by mass.

The presence of vinyl groups in the first silicone layer was detected. The mean modulus of elasticity of the first silicone layer was 1.8 MPa and the mean modulus of elasticity of the second silicone layer was and 60.1 MPa, so that the difference was 58.3 MPa. The silicon concentration in the second silicone layer was 38.5% by mass. The spot diameter was 22 mm.

Example 12

A printing plate was prepared and evaluated in the same manner as in Example 2 except that the composition-1 for forming a second silicone layer was changed to a composition-3 for forming a second silicone layer described below.

Composition-3 for Forming Second Silicone Layer

The following (a-8), (b-8), (c-8), and (d-8) components were put into a vessel and mixed by stirring until the components became homogeneous. Dry nitrogen was bubbled through the obtained solution for 20 minutes to remove water in the solution. Immediately before application, a (e-8) component was added and mixed by stirring to obtain a composition-3 for forming a second silicone layer.

(a-8) "ISOPAR" (registered trademark) C: 895.0 parts by mass;

(b-8) siloxane compound having three or more vinyl groups in its molecule (trimethylsiloxy-terminated-vinylmethylsiloxane-dimethylsiloxane copolymer): VDT-731 (manufactured by GELEST Inc., weight average molecular weight: 28,000, concentration of vinyl groups: 2.70% by mass, number of intramolecular vinyl groups: 28.0): 85.0 parts by mass;

(c-8) HMS-993: 15.0 parts by mass;

(d-8) 2-methyl-3-butyn-2-ol: 1.5 parts by mass;

(e-8) XC94-C4326: 3.5 parts by mass.

The presence of vinyl groups in the first silicone layer was detected. The mean modulus of elasticity of the first silicone layer was 1.8 MPa and the mean modulus of elasticity of the second silicone layer was 120 MPa, so that the difference was 118.2 MPa. The silicon concentration in the second silicone layer was 38.8% by mass. The spot diameter was 25 mm.

Example 13

A printing plate was prepared and evaluated in the same manner as in Example 2 except that the composition-1 for forming a second silicone layer was changed to a composition-4 for forming a second silicone layer described below.

Composition-4 for Forming Second Silicone Layer

The following (a-9), (b-9), (c-9), and (d-9) components were put into a vessel and mixed by stirring until the components became homogeneous. Dry nitrogen was bubbled through the obtained solution for 20 minutes to remove water in the solution. Immediately before application, a (e-9) component was added and mixed by stirring to obtain a composition-4 for forming a second silicone layer.

(a-9) "ISOPAR" (registered trademark) C: 895.0 parts by mass;

(b-9) siloxane compound having three or more vinyl groups in its molecule (trimethylsiloxy-terminated-vinylmethylsiloxane-dimethylsiloxane copolymer): VDT-5035 (manufactured by GELEST Inc., weight average molecular weight: 50,000, concentration of vinyl groups: 16.88% by mass, number of intramolecular vinyl groups: 311.9): 55.0 parts by mass;

(c-9) HMS-993: 45.0 parts by mass;

(d-9) 2-methyl-3-butyn-2-ol: 1.5 parts by mass;

(e-9) XC94-C4326: 3.5 parts by mass.

The presence of vinyl groups in the first silicone layer was detected. The mean modulus of elasticity of the first silicone layer was 1.8 MPa and the mean modulus of elasticity of the second silicone layer was 1360 MPa, so that the difference was 1358.2 MPa. The silicon concentration in the second silicone layer was 40.3% by mass. The spot diameter was 31 mm.

Example 14

A printing plate was prepared and evaluated in the same manner as in Example 2 except that the composition-1 for forming a second silicone layer was changed to a composition-5 for forming a second silicone layer described below.

Composition-5 for Forming Second Silicone Layer

The following (a-10), (b-10), (c-10), and (d-10) components were put into a vessel and mixed by stirring until the components became homogeneous. Dry nitrogen was bubbled through the obtained solution for 20 minutes to remove water in the solution. Immediately before application, a (e-10) component was added and mixed by stirring to obtain a composition-5 for forming a second silicone layer.
(a-10) "ISOPAR" (registered trademark) C: 895.0 parts by mass;
(b-10) VDT-5035: 25.0 parts by mass;
(c-10) HMS-993: 75.0 parts by mass;
(d-10) 2-methyl-3-butyn-2-ol: 1.5 parts by mass;
(e-10) XC94-C4326: 3.5 parts by mass.

The presence of vinyl groups in the first silicone layer was detected. The mean modulus of elasticity of the first silicone layer was 1.8 MPa and the mean modulus of elasticity of the second silicone layer was 1750 MPa, so that the difference was 1748.2 MPa. The silicon concentration in the second silicone layer was 44.3% by mass. The spot diameter was 35 mm.

Example 15

A printing plate was prepared and evaluated in the same manner as in Example 2 except that the composition-1 for forming a second silicone layer was changed to a composition-6 for forming a second silicone layer described below.

Composition-6 for Forming Second Silicone Layer

The following (a-11), (b-11), and (c-11) components were put into a vessel and mixed by stirring until the components became homogeneous. Dry nitrogen was bubbled through the obtained solution for 20 minutes to remove water in the solution. Immediately before application, a (d-11) component was added and mixed by stirring to obtain a composition-6 for forming a second silicone layer.
(a-11) "ISOPAR" (registered trademark) C: 895.0 parts by mass;
(b-11) HMS-993: 100.0 parts by mass;
(c-11) 2-methyl-3-butyn-2-ol: 1.5 parts by mass;
(d-11) XC94-C4326: 3.5 parts by mass.

The presence of vinyl groups in the first silicone layer was detected. The mean modulus of elasticity of the first silicone layer was 1.8 MPa and the mean modulus of elasticity of the second silicone layer was 2200 MPa, so that the difference was 2198.2 MPa. The silicon concentration in the second silicone layer was 46.7% by mass. The spot diameter was 37 mm.

Example 16

A printing plate was prepared and evaluated in the same manner as in Example 2 except that the composition-2 for forming a first silicone layer was changed to a composition-5 for forming a first silicone layer described below.

Composition-5 for Forming First Silicone Layer

The following (a-12), (b-12), (c-12), and (d-12) components were put into a vessel and mixed by stirring until the components became homogeneous. Dry nitrogen was bubbled through the obtained solution for 20 minutes to remove water in the solution. A (e-12) component was added to the obtained solution, and mixed by stirring for 10 minutes. Immediately before application, a (f-12) component was added and mixed by stirring to obtain a composition-5 for forming a first silicone layer.

(a-12) "ISOPAR" (registered trademark) E: 895.0 parts by mass;
(b-12) VDT-954: 62.0 parts by mass;
(c-12) HMS-064: 15.0 parts by mass;
(d-12) liquid having a surface tension at 25° C. of 30 mN/m or less: KF-96-50cs (dimethyl silicone oil, weight average molecular weight: 3,780, surface tension at 1 atm and at 25° C.: 20.8 mN/m, mass reduction after being heated in a 1-atm environment at 150° C. for 24 hours: 0.1% by mass, manufactured by Shin-Etsu Chemical Co., Ltd.): 20.0 parts by mass;
(e-12) vinyltris(methylethylketoximino)silane: 3.0 parts by mass;
(f-12) XC94-C4326: 5.0 parts by mass.

The presence of vinyl groups in the first silicone layer was detected. The mean modulus of elasticity of the first silicone layer was 0.9 MPa and the mean modulus of elasticity of the second silicone layer was 720 MPa, so that the difference was 719.1 MPa. The silicon concentration in the second silicone layer was 40.0% by mass. The spot diameter was 28 mm.

Comparative Example 1

A printing plate was prepared and evaluated in the same manner as in Example 2 except that the composition-1 for forming a second silicone layer was changed to a composition-2 for forming a first silicone layer.

The presence of vinyl groups in the first silicone layer was detected. The mean modulus of elasticity of the first silicone layer was 1.8 MPa and the mean modulus of elasticity of the second silicone layer was 1.8 MPa, so that the difference was 0 MPa. The silicon concentration in the second silicone layer was 36.5% by mass. The spot diameter was 9 mm.

Comparative Example 2

A printing plate was prepared and evaluated in the same manner as in Example 2 except that the composition-2 for forming a first silicone layer was changed to a composition-1 for forming a second silicone layer.

The presence of vinyl groups in the first silicone layer was not detected. The mean modulus of elasticity of the first silicone layer was 720 MPa and the mean modulus of elasticity of the second silicone layers was 720 MPa, so that the difference was 0 MPa. The silicon concentration in the second silicone layer was 40.0% by mass. The spot diameter was 28 mm.

Comparative Example 3

A printing plate was prepared and evaluated in the same manner as in Example 2 except that the composition-1 for forming a second silicone layer was changed to a composition-7 for forming a second silicone layer described below.

Composition-7 for Forming Second Silicone Layer

The following (a-13), (b-13), (c-13), and (d-13) components were put into a vessel and mixed by stirring until the components became homogeneous. Dry nitrogen was bubbled through the obtained solution for 20 minutes to remove water in the solution. Immediately before application, a (e-13) component was added and mixed by stirring to obtain a composition-7 for forming a second silicone layer.
(a-13) "ISOPAR" (registered trademark) C: 895.0 parts by mass;

(b-13) VDT-954: 95.0 parts by mass;
(c-13) HMS-993: 5.0 parts by mass;
(d-13) 2-methyl-3-butyn-2-ol: 1.5 parts by mass;
(e-13) XC94-C4326: 3.5 parts by mass.

The presence of vinyl groups in the first silicone layer was detected. The mean modulus of elasticity of the first silicone layer was 1.8 MPa and the mean modulus of elasticity of the second silicone layer was 23.4 MPa, so that the difference was 21.6 MPa. The spot diameter was 12 mm.

Comparative Example 4

A printing plate was prepared and evaluated in the same manner as in Example 2 except that the composition-1 for forming a second silicone layer was changed to a composition-8 for forming a second silicone layer described below.

Composition-8 for Forming Second Silicone Layer

The following (a-14), (b-14), (c-14), and (d-14) components were put into a vessel and mixed by stirring until the components became homogeneous. Dry nitrogen was bubbled through the obtained solution for 20 minutes to remove water in the solution. Immediately before application, a (e-14) component was added and mixed by stirring to obtain a composition-8 for forming a second silicone layer.
(a-14) "ISOPAR" (registered trademark) C: 895.0 parts by mass;
(b-14) VDT-954: 94.6 parts by mass;
(c-14) siloxane compound having three or more SiH groups in its molecule (trimethylsiloxy-terminated-methyl-hydrosiloxane-dimethylsiloxane copolymer): HMS-501 (manufactured by GELEST Inc., weight average molecular weight: 1,050, concentration of H groups derived from SiH groups: 0.74% by mass, number of intramolecular SiH groups: 7.8) 5.4 parts by mass;
(d-14) 2-methyl-3-butyn-2-ol: 1.5 parts by mass;
(e-14) XC94-C4326: 3.5 parts by mass.

The presence of vinyl groups in the first silicone layer was detected. The mean modulus of elasticity of the first silicone layer was 1.8 MPa and the mean modulus of elasticity of the second silicone layer was 10.8 MPa, so that the difference was 9.0 MPa. The silicon concentration in the second silicone layer was 37.4% by mass. The spot diameter was 11 mm.

Comparative Example 5

A printing plate was prepared and evaluated in the same manner as in Example 2 except that the composition-1 for forming a second silicone layer was changed to a composition-9 for forming a second silicone layer described below.

Composition-9 for Forming Second Silicone Layer

The following (a-15), (b-15), (c-15), and (d-15) components were put into a vessel and mixed by stirring until the components became homogeneous. Dry nitrogen was bubbled through the obtained solution for 20 minutes to remove water in the solution. Immediately before application, a (e-15) component was added and mixed by stirring to obtain a composition-9 for forming a second silicone layer.
(a-15) "ISOPAR" (registered trademark) C: 895.0 parts by mass;
(b-15) siloxane compound having three or more vinyl groups in its molecule (trimethylsiloxy-terminated-polyvinylmethylsiloxane): VMS-T11 (manufactured by GELEST Inc., weight average molecular weight: 1,250, concentration of vinyl groups: 27.33% by mass, number of intramolecular vinyl groups: 12.7): 2.65 parts by mass;
(c-15) siloxane compound having three or more SiH groups in its molecule (trimethylsiloxy-terminated-methyl-hydrosiloxane-dimethylsiloxane copolymer): HMS-082 (manufactured by GELEST Inc., weight average molecular weight: 6,000, concentration of H groups derived from SiH groups: 0.11% by mass, number of intramolecular SiH groups: 6.5) 97.35 parts by mass;
(d-15) 2-methyl-3-butyn-2-ol: 1.5 parts by mass;
(e-15) XC94-C4326: 3.5 parts by mass.

The presence of vinyl groups in the first silicone layer was detected. The mean modulus of elasticity of the first silicone layer was 1.8 MPa and the mean modulus of elasticity of the second silicone layer was 30.6 MPa, so that the difference was 28.8 MPa. The spot diameter was 13 mm.

Evaluation results from Examples 1 to 16 and Comparative Examples 1 to 5 are shown in Table 1.

In Comparative Examples 1 and 3 to 5, since the second silicone layer did not receive the ink at all, the image reproducibility and the printing durability could not be evaluated. In Comparative Example 2, since the first silicone layer did not repel the ink at all, the image reproducibility and the printing durability could not be evaluated.

TABLE 1

| No. | Image Reproducibility (Mean Line Width [μm]) | Ink Acceptability | Ink Repellency | Printing Durability |
|---|---|---|---|---|
| Example 1 | 4 | A | A | B |
| Example 2 | 4 | A | A | A |
| Example 3 | 4 | A | A | A |
| Example 4 | 4 | A | A | A |
| Example 5 | 4 | A | A | A |
| Example 6 | 4 | A | A | A |
| Example 7 | 10 | A | A | A |
| Example 8 | 18 | A | A | B |
| Example 9 | 4 | A | B | A |
| Example 10 | 4 | A | A | A |
| Example 11 | 4 | B | A | A |
| Example 12 | 4 | A | A | A |
| Example 13 | 4 | A | A | A |
| Example 14 | 4 | A | A | B |
| Example 15 | 4 | A | A | C |
| Example 16 | 4 | A | A | A |
| Comparative Example 1 | — | D | A | — |
| Comparative Example 2 | — | A | D | — |
| Comparative Example 3 | — | D | A | — |
| Comparative Example 4 | — | D | A | — |
| Comparative Example 5 | — | D | A | — |

Example 17

A printing plate was prepared using the same composition and conditions as in Example 2 and mounted on an LED-UV offset rotary printing press: MHL13A (manufactured by Miyakoshi Co, Ltd.). A water-soluble UV ink for films, UV171 NH TBS ink (manufactured by T&K TOKA Corporation) was printed onto a printing object medium that was non-absorptive for the ink component, "EMBLET" (registered trademark) PTM-12 (rolled, biaxial oriented PET film, thickness: 12 μm, print side: easy adhesion treatment, manufactured by UNITIKA Ltd.) by 20,000 m under the conditions of UV wavelength: 385 nm, UV radiation intensity: 8 W/cm², printing speed: 100 m/min, temperature of surface of printing plate: 25° C. to 28° C. A portion of the printed matter at around 20,000 m was cut out and placed on five layers of coated paper: OK "TopKote" (registered trademark) plus (manufactured by Oji Paper Co., Ltd.), and the ink acceptability, the ink repellency, and the printing durability were evaluated. The ink reflection density of the solid portion of the printed matter was 1.6, demonstrating good ink acceptability. In addition, no scumming was observed in the white solid portion at all, demonstrating good ink repellency. Furthermore, no drop of fine lines was observed at all, demonstrating good printing durability. The evaluation results are shown in Table 2.

TABLE 2

| No. | Ink Acceptability | Ink Repellency | Printing Durability |
| --- | --- | --- | --- |
| Example 17 | Good (1.6) | Good (no scumming) | Good (no dropout of fine lines) |

REFERENCE SIGNS LIST

1: Ink roller
2: Printing plate
3: Plate cylinder
4: Blanket cylinder
5: Printing object medium
6: Impression cylinder

The invention claimed is:

1. A printing plate comprising an ink repellent first silicone layer and an ink acceptive second silicone layer in this order on a support, wherein
the first silicone layer and the second silicone layer comprise 60% by mass or more of a cross-linked siloxane compound,
the mean modulus of elasticity of the first silicone layer is 0.001 to 10 MPa, and
the mean modulus of elasticity of the second silicone layer is 60 to 2,000 MPa.

2. The printing plate according to claim 1, wherein the difference between the mean modulus of elasticity of the first silicone layer and the mean modulus of elasticity of the second silicone layer is 50 to 1,900 MPa.

3. The printing plate according to claim 1, wherein when 12 μl of dimethyl silicone oil with a liquid viscosity of 20 cSt is contacted with the surface of the second silicone layer, the spot diameter 10 minutes after the contact is 20 to 37 mm.

4. The printing plate according to claim 1, wherein the mean film thickness of the second silicone layer is 0.1 to 5 μm.

5. The printing plate according to claim 1, wherein the silicon concentration in the second silicone layer is 25 to 50% by mass.

6. The printing plate according to claim 1, wherein the mean film thickness of the first silicone layer is 3 to 30 μm.

7. The printing plate according to claim 1, wherein the first silicone layer comprises a compound having a vinyl group.

8. The printing plate according to claim 1, wherein the first silicone layer comprises 5 to 40% by mass of a liquid having a surface tension at 25° C. of 30 mN/m or less.

9. A method of manufacturing the printing plate according to claim 1, comprising:
applying a composition for forming a second silicone layer on the entire surface of the first silicone layer provided on a support to provide a second silicone layer;
irradiating the resultant from the side of the second silicone layer with a laser beam; and
ablating the second silicone layer, or the second silicone layer and the upper portion of the first silicone layer, in the laser-irradiated area.

10. The method of manufacturing the printing plate according to claim 9, wherein the laser is a carbon dioxide gas laser or a high-power UV laser.

11. A method of manufacturing printed matter on a printing object medium, which comprises the step of applying an ink on the surface of the printing plate of claim 1, and transferring the ink from the printing plate to the printing object medium directly or via a blanket.

12. The method of manufacturing printed matter according to claim 11, wherein the ink is an active energy ray curing ink.

13. The method of manufacturing printed matter according to claim 11, wherein the ink is a water-soluble ink.

14. The method of manufacturing printed matter according to claim 11, wherein the printing object medium is non-absorptive for the ink component.

15. The method of manufacturing printed matter according to claim 11, wherein the printing object medium is a food packaging base material.

* * * * *